United States Patent
Feldhaus et al.

[11] Patent Number: 6,047,804
[45] Date of Patent: Apr. 11, 2000

[54] TORSIONAL VIBRATION DAMPER

[75] Inventors: Reinhard Feldhaus, Ebenhausen; Jürgen Kleifges; Andreas Orlamünder, both of Schweinfurt, all of Germany

[73] Assignee: Mannesmann Sachs AG, Schweinfurt, Germany

[21] Appl. No.: 09/127,367

[22] Filed: Jul. 31, 1998

[30] Foreign Application Priority Data

Aug. 1, 1997 [DE] Germany .................... 197 33 334

[51] Int. Cl.[7] .................................. F16D 13/68
[52] U.S. Cl. .......................... 192/70.17; 192/213.2
[58] Field of Search ................ 192/70.17, 213.2, 192/70.19, 200; 74/574

[56] References Cited

U.S. PATENT DOCUMENTS

| | | | |
|---|---|---|---|
| 5,105,681 | 4/1992 | Naudin et al. | 74/574 |
| 5,156,249 | 10/1992 | Friedmann | 192/106.2 |
| 5,307,710 | 5/1994 | Feldhaus et al. | 74/574 |
| 5,382,193 | 1/1995 | Friedman | 464/64 |
| 5,601,002 | 2/1997 | Lucienne | 74/574 |
| 5,624,317 | 4/1997 | Scherling et al. | 464/68 |
| 5,878,856 | 3/1999 | Sudau et al. | 192/70.17 |

FOREIGN PATENT DOCUMENTS

| | | |
|---|---|---|
| 777 059 | 6/1997 | European Pat. Off. . |
| 195 44 832 | 6/1997 | Germany . |
| 2217429 | 10/1989 | United Kingdom . |
| 2 269 440 | 2/1994 | United Kingdom . |
| 2274324 | 7/1994 | United Kingdom . |
| 2285109 | 6/1995 | United Kingdom . |
| 2 303 426 | 2/1997 | United Kingdom . |

*Primary Examiner*—Charles A. Marmor
*Assistant Examiner*—Tisha D. Waddell
*Attorney, Agent, or Firm*—Cohen, Pontani, Lieberman & Pavane

[57] ABSTRACT

A torsional vibration damper having a first damper element and a second damper element, which are connected to each other for the purpose of torque transmission by a first damping spring device. The first damping spring device has at least one damping spring arrangement with at least one damping spring. One of the damper element has a support on which the damping spring arrangement is supported in its respective end areas in approximately the circumferential direction via support elements. Further, a displacement surface is embodied on the first damper element for each support element. On the other damper element, there are carriers for each support element. Upon a relative rotation between the first and second damper elements, the carrier serve to take along the respective support elements and press them in the direction of the displacement surface for the purpose of movement along the associated displacement surface. At least in the area of the displacement surface, there is a lubricant chamber sealed at least toward the radial outside and with lubricant located therein.

18 Claims, 12 Drawing Sheets

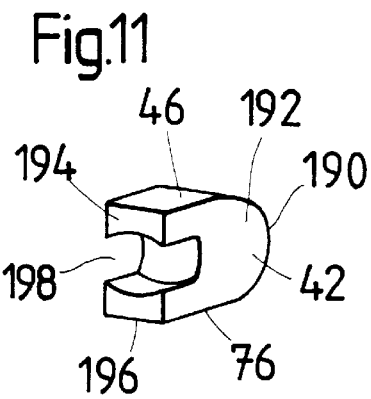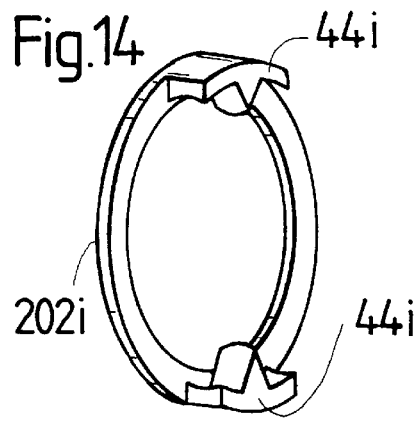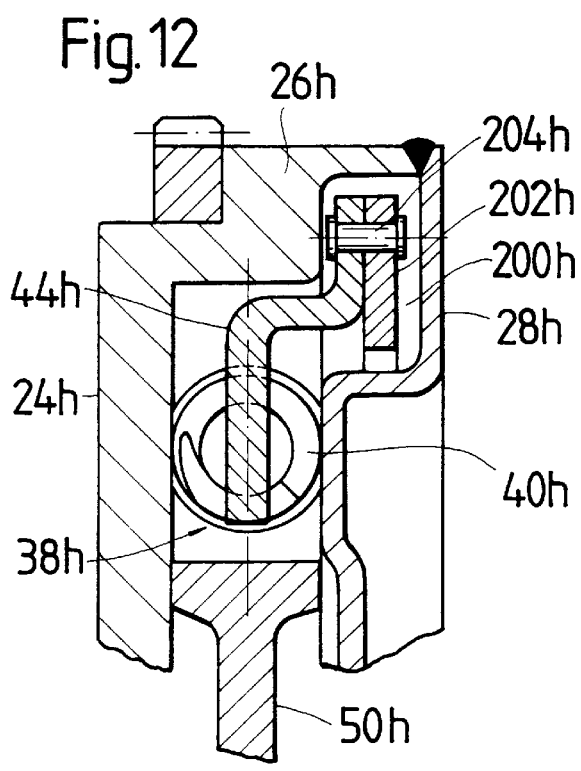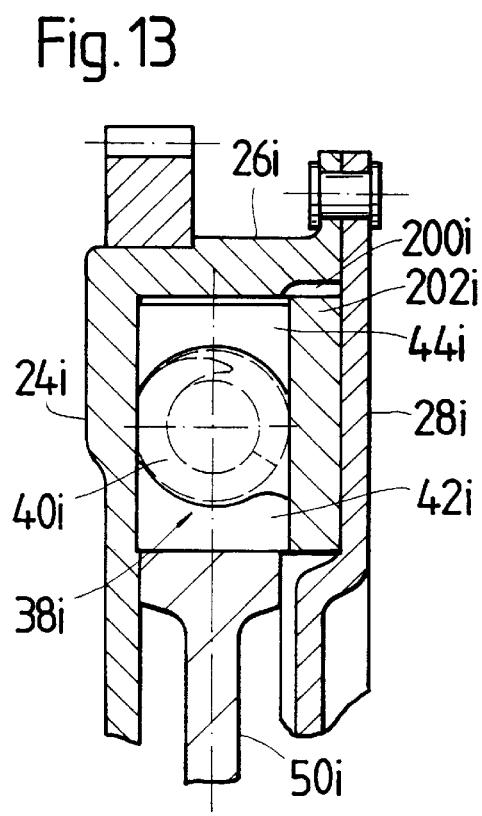

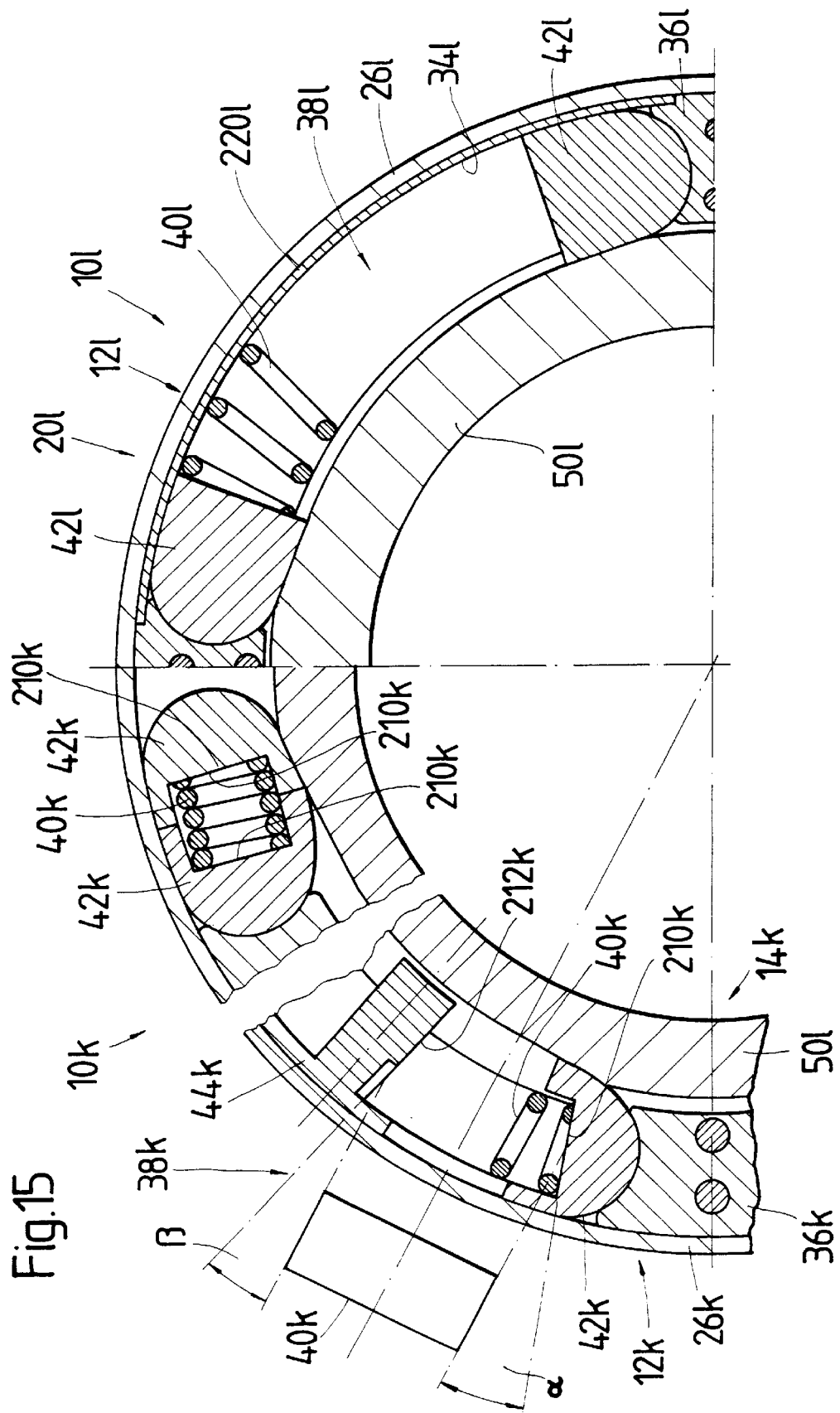

TORSIONAL VIBRATION DAMPER

SUMMARY OF THE INVENTION

1. Field of the Invention

The present invention relates to a torsional vibration damper, particularly for damping torsional vibrations occurring in a drive train of a motor vehicle.

2. Discussion of the Prior Art

A torsional vibration damper of this type is known, for example, from German reference DE 195 44 832 A1. In this known torsional vibration damper, the first and second damper elements are concentric to each other, at least in areas, and radially staggered. The displacement surfaces for the respective support elements are formed on the first damper element on inner circumferential surface segments that point radially inward. The carrier means are formed by an outer circumferential surface contour of the second damper element. Specifically, the second damper element is embodied in the shape of a polygon, so that, seen in the circumferential direction, ramp-like elevations that project radially outward are formed, by means of which the support elements can be carried along when the first and second damper elements turn relative to each other. In the case of these carrier means, the support elements move radially outward on the respective displacement surfaces. A wedge angle is thereby formed between the ramp-like carrier means and the displacement surface, into which wedge angle the support elements, which themselves have a wedge-like configuration, are pressed by the spring action of the damping springs. Thus, the second damper element, with its outer circumferential surface, i.e., the ramp-like areas projecting radially outward, presses the support elements against the displacement surface in question, producing a frictional force. In this way, a combined damping effect is provided by the damping springs and the production of frictional force.

In the above-described special embodiment of the known torsional vibration damper, the movement carried out along the displacement surfaces to produce the frictional force results in wear. This wear creates the danger that the support elements will become jammed or wedged in, and increases the risk that the guide flanges of the support elements will break under a bending load.

SUMMARY OF THE INVENTION

It is therefore the object of the present invention to provide a torsional vibration damper with a reduced risk of wear in the area of components that rub against each other.

According to the invention, this object is attained by means of a torsional vibration damper, particularly for damping torsional vibrations occurring in the drive train of a motor vehicle, that comprises: a first damper element; a second damper element rotatable relative to the first damper element around a rotational axis; and a first damping spring device that connects the first and second damper elements for the purpose of torque transmission. The first damping spring device comprises at least one damping spring arrangement, which extends in approximately a circumferential direction and has at least one damping spring. Support means for the damping spring arrangement(s) are provided on the first or second damper element. The damping spring arrangement is supported on these support means at its respective end areas via support elements arranged at each end area in approximately the circumferential direction. For each support element, a displacement surface along which the support element can be moved in the circumferential direction is embodied on the first damper element. Further, carrier means associated with each support element are provided on the other damper element. When the first and second damper elements turn relative to each other, the associated support element can, for the purpose of a displacement movement along the associated displacement surface on the first damper element, be taken along by the carrier means and pressed in the direction of the displacement surface.

Further, according to the invention, a lubricant chamber containing lubricant that is sealed at least to the radial outside is provided at least in the area of the displacement surface. Thus, because of the lubricant that penetrates between the components rubbing against each other, the danger of jamming or wedging as well as the risk of wear is reduced in the problematic area where displacement occurs and frictional force is produced.

Another problem that exists in the generic torsional vibration damper is that torsional vibrations occurring near the resonance frequency of the drive train or the torsional vibration damper cannot be adequately damped. It is therefore further proposed by the present invention that the damping spring(s) be arranged in the lubricant chamber and immersed in the lubricant, at least in areas. As a result, in addition to the damping effect provided by the spring compression and the frictional force production, a contribution to damping is made by the movement of the damping spring and the support elements in the lubricant. This leads to significantly better damping performance, especially in the area of the resonance frequency.

The lubricant chamber can be formed, for example, by a first substantially radially extending disk-like section of the first damper element; a substantially axially extending cylinder-like section attached to the first disk-like section in a radially outer area; and a second substantially radially extending disk-like section (preferably a disk-ring-like section) attached with its radially outer end area to the cylinder-like section at the end thereof that faces away from the first disk-like section.

Preferably, the displacement surface is then embodied on an inner circumferential surface of the cylinder-like section.

To prevent the lubricant from moving radially inward when no centrifugal force is acting on it, e.g., during a standstill, and then emerging from the lubricant chamber, it is proposed that the second damper element be rotatably mounted by means of a bearing arrangement on the first damper element and/or a component securely connected thereto, and that the bearing arrangement form a first sealing arrangement for the lubricant chamber relative to an axial side of the second damper element.

Further, it is then advantageous to provide a second sealing arrangement, which acts between the second disk-like section and the second damper element on the other axial side of the second damper element.

Clear cost savings can be obtained in constructing the torsional vibration damper according to the invention because of the fact that the first disk-like section and/or the cylinder-like section, preferably integrally with the first disk-like section, and/or the second disk-like section and/or the second damper element comprises at least one sheet metal part, preferably formed in a deep-drawing process.

Another problem in the generic torsional vibration damper known from German reference DE 195 44 832 A1 is that torque peaks that occur during operation, e.g., in the event of the reversal or sudden release of a motor vehicle friction clutch, can be transmitted via the torsional vibration damper and can then damage components of the drive system.

Therefore, according to a further aspect of the present invention, it is proposed to provide a torsional vibration damper with an overload protection device for damping torque peaks transmitted via the torsional vibration damper.

The overload protection device can comprise at least one slip clutch arrangement. Such slip clutch arrangements have a slip moment designed for a particular torque range. Up to a given slip moment, the slip clutch arrangements can transmit a torque without slip between their components. When the given slip moment is exceeded, slip occurs, and thus the torque transmissible via the slip clutch arrangement is reduced.

For example, the overload protection device can comprise a slip clutch arrangement acting between two components of the first damper element and/or a slip clutch arrangement acting between two components of the second damper arrangement.

Further, it is possible for the slip clutch arrangement(s) to comprise a slip ring element arranged rotatably on one damper element and acting thereon in a friction-locking fashion. Arranged on this slip ring element are the displacement surface and the support means. Alternatively or in addition to this, the overload protection device can comprise a frictional force production device acting between the first and second damper elements or components securely connected thereto.

The frictional force production device produces a frictional force that increases as the relative rotational angle between the first and second damper elements increases. Further, in such known overload protection devices, which generally act as entrained friction devices, the frictional force production device cannot produce any substantial frictional force before a threshold relative rotational angle is reached. After the threshold relative rotational angle is exceeded, the frictional force production device can produce a substantially constant frictional force or a frictional force that increases as the relative rotational angle increases.

In the torsional vibration damper known from German reference DE 195 44 832 A1, the second damper element is rotatably mounted on the first damper element or on a component securely connected thereto. If a torsional vibration damper of this type is integrated into a drive train, for example, in the form of a dual-mass flywheel of a friction clutch, the problem exists that, because the input and output axes are offset and at least one axis performs wobbling movements, heavy wear occurs in the region of the bearing of the two damper elements. To avoid such wear, it is proposed according to a further aspect of the invention to embody a generic torsional vibration damper, with respect to its bearing arrangement, in such a way that the first and second damper elements can carry out at least a tilting movement and/or a shifting movement in the radial direction relative to each other.

Should the aforementioned wobbling movements of at least one shaft section and thus of the damper element securely connected thereto occur in a torsional vibration damper constructed in this manner, the damper elements can tilt or shift relative to each other, without higher loads thereby being created in the area of the bearing of the two damper elements.

Here, the term "tilting movement" refers to the fact that at least one of the damper elements can tilt relative to the geometric rotational axis, and can thus assume an angle that differs from the geometric rotational axis by 90°. Of course, the term also encompasses the simultaneous tilting of both damper elements, possibly even parallel to each other. The term "shifting movement in the radial direction" refers to a movement of the two damper elements relative to each other, independent of their given tilting states, by means of which the two damper elements are displaced from their basic arrangement. It goes without saying that, depending on the tilting state, this radial shifting movement can also contain an axial displacement component.

It is possible, for example, for the bearing arrangement to comprise at least one elastically deformable bearing component, preferably a slide bearing component.

Advantageously, the bearing arrangement is embodied so as to comprise a bearing component that acts substantially in the axial direction between the first and second damper elements, as well as a bearing component that acts substantially in the radial direction between the first and second damper elements.

To further facilitate tilting, the second damper element has a convex bearing surface designed to rest on the bearing arrangement. Moreover, it is then advantageous for the carrier means on the other damper element to comprise a convex carrier surface.

The torsional vibration damper known from German reference DE 195 44 832 A1 has, in each damping spring arrangement, one damping spring for the load area. Consequently, this embodiment, which has a relatively low spring volume, functions in an unsatisfactory manner at various torsional vibration frequencies.

It is therefore proposed according to a further aspect of the present invention to provide a generic torsional vibration damper in which the damping spring arrangement(s) comprises at least two damping springs, and the damping springs are supported at their adjacent end areas on an intermediate element that is movable relative to the first damper element in the circumferential direction. Such an embodiment of the damping spring arrangement with two serially-connected damping springs creates a significantly larger spring volume and thus attains a better vibrational damping characteristic.

The intermediate element can comprise a slide element movable on the displacement surface. In such an embodiment of the torsional vibration damper, it is proposed, so as to ensure that the intermediate element detracts as little as possible from damping performance, that the intermediate element be movable in the circumferential direction relative to the first damper element without substantial friction.

To this end, the torsional vibration damper can comprise, for example, a plurality of damping spring arrangements arranged at substantially equal distances from each other in the circumferential direction. The respective intermediate elements for the multiple damping spring arrangements are thereby arranged on a carrier ring rotatable relative to the first damper element. The provision of multiple damping spring arrangements with circumferential spacing and the interaction of these damping spring arrangements with the respective intermediate elements arranged on the carrier ring create a self-centering arrangement, wherein the intermediate ring, without resting on any other damper component, is securely held in its radial position in a manner substantially independent of the rotational state.

To ensure a suitable damping performance in all speed and load states, it is proposed according to a further aspect of the present invention that the torsional vibration damper comprise at least one further damping spring device arranged effectively in series with the first damping spring device. For example, the damping spring device(s) can be an idle damping spring device that is effective upon the introduction of very low torques and becomes ineffective when a limit value is exceeded, either before or after the first damping spring device has taken over the damping function. It is equally possible for the further damping spring device (s) to be a high-load damping device that is effective in states of very high torque introduction, in which the first damping spring device can virtually no longer contribute to rotational vibration damping. The provision of a high-load damping device and an idle damping device in conjunction with the first damping spring device is also possible.

It is again advantageous for the further damping spring device(s) to comprise at least one damping spring arrangement with at least one damping spring.

An especially space-saving and simple embodiment can be attained when the further damping spring device(s) provides a torque transmission connection between two components of the first damper element rotatable relative to each other and/or between two components of the second damper element rotatable relative to each other.

It is possible for a friction clutch with a clutch disk, for example, to be associated with the torsional vibration damper according to the invention. In this case, the clutch disk can comprise the further damping spring device that acts between two components of the clutch disk rotatable relative to each other. Thus, the structural space available in the area of the clutch disk can also be effectively used.

When torques that exceed the torque damping range of a particular damping spring device are introduced, in order to prevent damage to the damping spring devices or the damping springs arranged therein, the first damping spring device and/or, as needed, the further damping spring device(s) is associated with final stop means to limit the relative rotational angle of the given components rotatable relative to each other.

In the torsional vibration damper known from German reference DE 195 44 832 A1, the support elements are substantially held in the axial direction between the first and second damper elements. That is, it is possible for frictional contact to occur between the support elements and the second damper element during the relative rotation of the two damper elements. This is especially disadvantageous and problematic when the second damper element constitutes a flywheel component of a motor vehicle friction clutch. Such a flywheel component is provided for heat absorption and heat extraction during clutch operation. Therefore, due to the possible frictional contact between the second damping element and the support elements, the danger exists of undesired heat introduction into the support elements. These support elements, for reasons of cost and frictional force adjustment in the region of the displacement surface, are preferably made of plastic, and the introduction of heat can damage or destroy them.

To avoid this, it is proposed according to a further aspect of the present invention that, in a generic torsional vibration damper, wherein the displacement surface is located on an inner circumferential surface of a substantially axially extending cylinder-like section of one damper element, support element axial securing means acting between the damper element and each support element are also provided.

Furthermore, it is also advantageous, particularly when the damping spring arrangement(s) comprises at least two damping springs, which are supported in their adjacent end areas on an intermediate element movable, preferably on the displacement surface, relative to one damper element in the circumferential direction, to provide axial securing means for the intermediate element. For example, the support element axial securing means and/or, as needed, the intermediate element axial securing means can comprise a circumferential groove on an element of the displacement surface and the support element or intermediate element and, on the other element, a securing projection area that engages into the aforementioned circumferential groove.

In an arrangement of the torsional vibration damper according to the invention that saves space in the axial direction, one damper element comprises a substantially radially extending disk-like section, which is connected in a radially outer region to the cylinder-like section and is arranged on a first axial side of each support element. The other damper element comprises a substantially radially extending disk-like section that, in a radially outer area, lies opposite to the other axial side of each support element. Such an embodiment dispenses with a corresponding disk-like section of the first damper element located opposite to the radially extending disk-like section of the first damper element on the other axial side of the support elements, so that no lubricant chamber is formed, either.

In such an embodiment, to preserve a cooling function, which can also be carried out by a lubricant, for example, a predetermined axial distance is embodied between the disk-like section of the other damper element and each support element. This predetermined axial distance creates an entry opening for cooling air, so that the heat created in the area of the second damping element can be extracted quickly and without being transferred to other components.

As already discussed, it is necessary in drive systems to provide different damping characteristics in different speed or torque ranges, so as to obtain a suitable vibration damping function for each torque range. According to a further aspect of the present invention, it is therefore proposed that the damping spring(s) provides a spring characteristic that changes as the relative rotation between the first and second damper elements increases.

This can be achieved, for example, by the fact that the damping spring(s) has an approximately straight-line configuration in the basic state and, in the installed state and in a load-free state of the torsional vibration damper, is more strongly prestressed in a radially inner spring area than in a radially outer spring area.

In such an arrangement, the radially inner area of the damping spring is substantially effective initially due to its strong prestress. As compression increases, however, the radially outer area also becomes more strongly prestressed, so that a combined spring characteristic that changes progressively as the compression changes is obtained from the spring characteristics of the radially inner area and the radially outer area of the damping spring.

To use the damping capacity of the damping spring(s) to the greatest possible extent, it is proposed that the damping spring(s), in its substantially maximally compressed state, be prestressed in its radially outer and radially inner areas to a substantially equal extent. This means that the damping spring(s) assumes a substantially straight-line configuration in its substantially maximally compressed state.

It is also possible to set the spring characteristic, which changes as a function of the rotational state, by virtue of the fact that the damping spring(s) is supported, at least in one of its end areas, on a support surface whose radially outer support area is offset in the circumferential direction, relative to its radially inner support area, away from an end area of the damping spring(s). The offset can be so great that only the radially inner area of the damping spring is substantially supported in a load-free state or low-load state, while the radially outer area does not come to rest on the radially outer support area of the support surface, thus contributing to the damping effect, until a certain torque is exceeded.

To further enlarge the spring volume in a generic torsional vibration damper, it is proposed according to a further embodiment of the present invention that the damping spring(s) preferably be curved and extend in the circumferential direction, and that there be radial support means to support the damping spring in its radially outer area, preferably along its entire length, toward the radial outside. The damping spring extending in the circumferential direction can, for example, be of such a length as to extend almost 180°, thus providing an extremely large spring volume. When the displacement surface forms the radial support means, no additional components need be provided for this purpose.

To prevent wear in the area of the radial support of the damping spring(s), the radial support means comprises a hardened support path. It should be noted that the provision of a hardened support path is equally advantageous in connection with the support elements, so that, for example, the displacement surface provided for the support elements can also comprise a hardened support path.

To maximize the spring volume of the damping spring arrangement(s), it is proposed that the damping spring arrangement(s) comprise a single damping spring. The circumferential extension area provided for the damping spring arrangement(s) can thereby be used to a maximum extent.

The torsional vibration damper can be embodied, for example, in such a way that the support element has an approximately wedge-shaped form that narrows in the circumferential direction. A displacement surface section of the support element resting on the displacement surface of one damper part thereby forms a first wedge surface, while a carrier surface designed to rest on the carrier means forms a second wedge surface. The carrier means comprise a carrier ramp surface area that is parallel, at least in areas, to the carrier surface. To prevent a concentration of load when the respective support elements move along the displacement surface, it is proposed that the displacement surface section have a surface contour matched at least approximately to a circumferential contour of the displacement surface.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 11 is a perspective view of a support element;

FIG. 12 is a partial longitudinal sectional view depicting the embodiment of the right intermediate element in FIG. 10;

FIG. 13 is a view corresponding to FIG. 12 of an alternative embodiment of the intermediate element and a carrier ring carrying the latter;

FIG. 14 is a perspective view of the carrier ring shown in FIG. 13 with the associated intermediate elements; and FIG. 15 shows various embodiments of damping spring arrangements in a torsional vibration damper according to the invention.

DETAILED DESCRIPTION OF THE PREFERRED EMBODIMENTS

Figure 1:
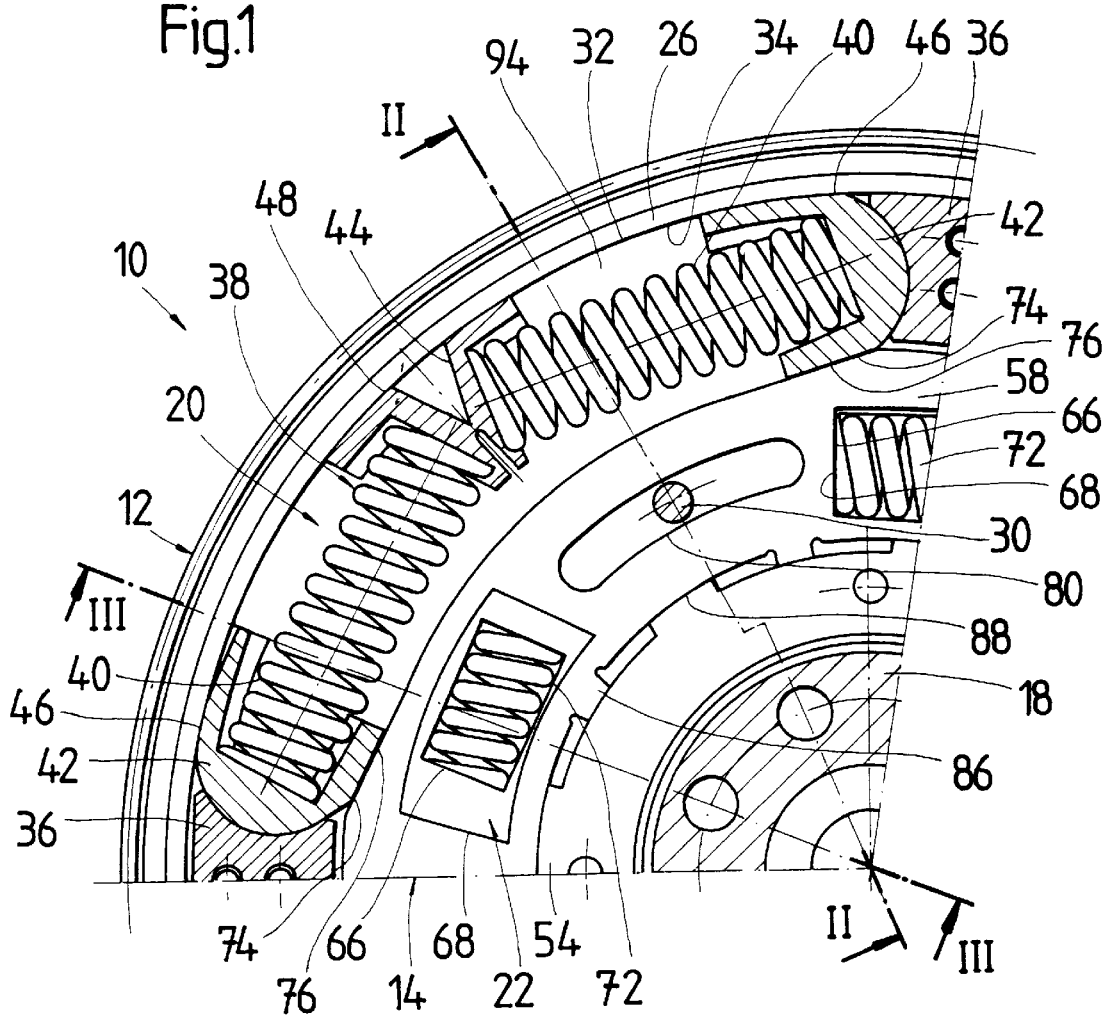
FIG. 1 is a segmented cross-section through a torsional vibration damper in a first embodiment of the present invention.
Figure 2:
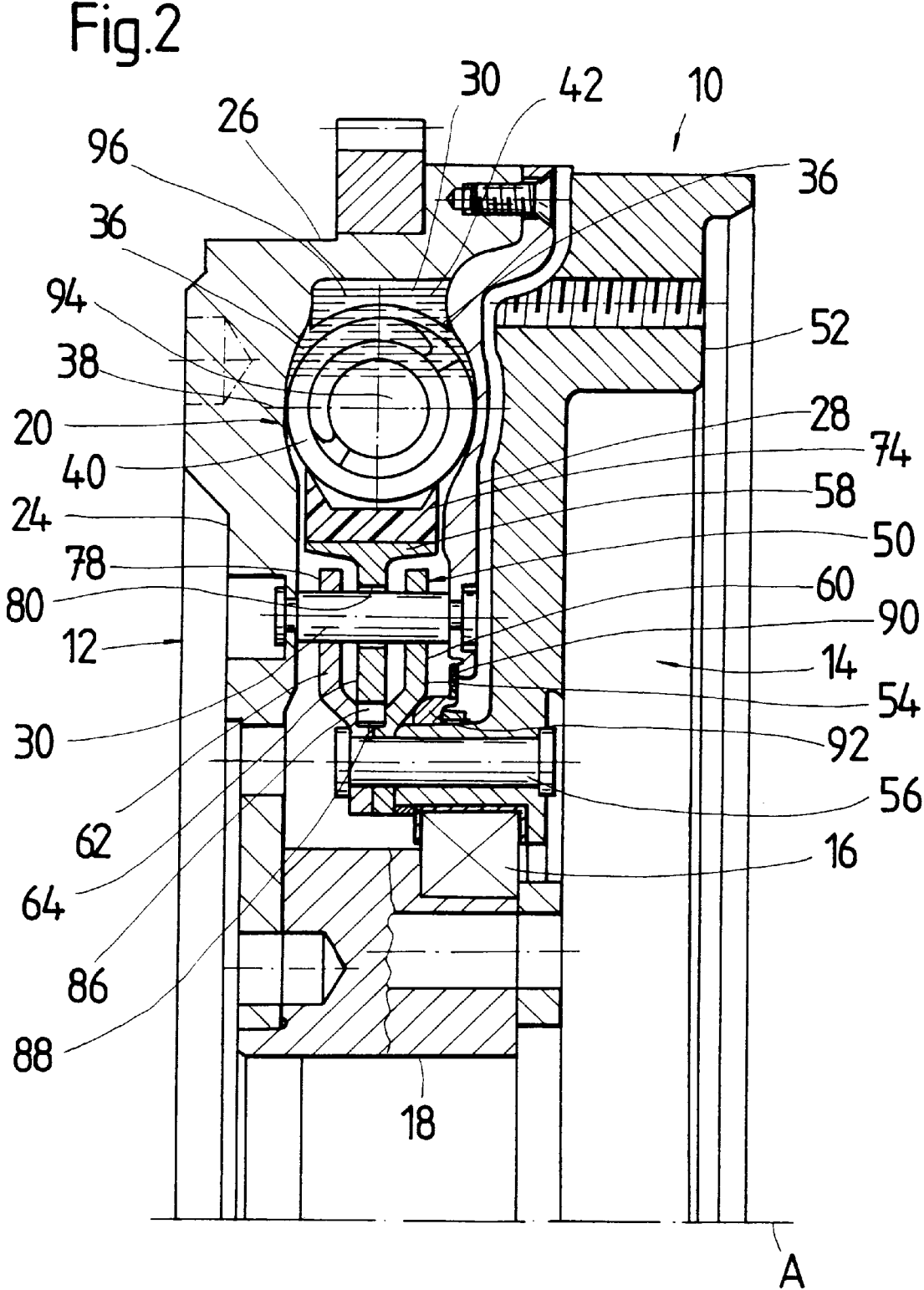
FIG. 2 is a sectional view along Line II—II in FIG. 1.
Figure 3:
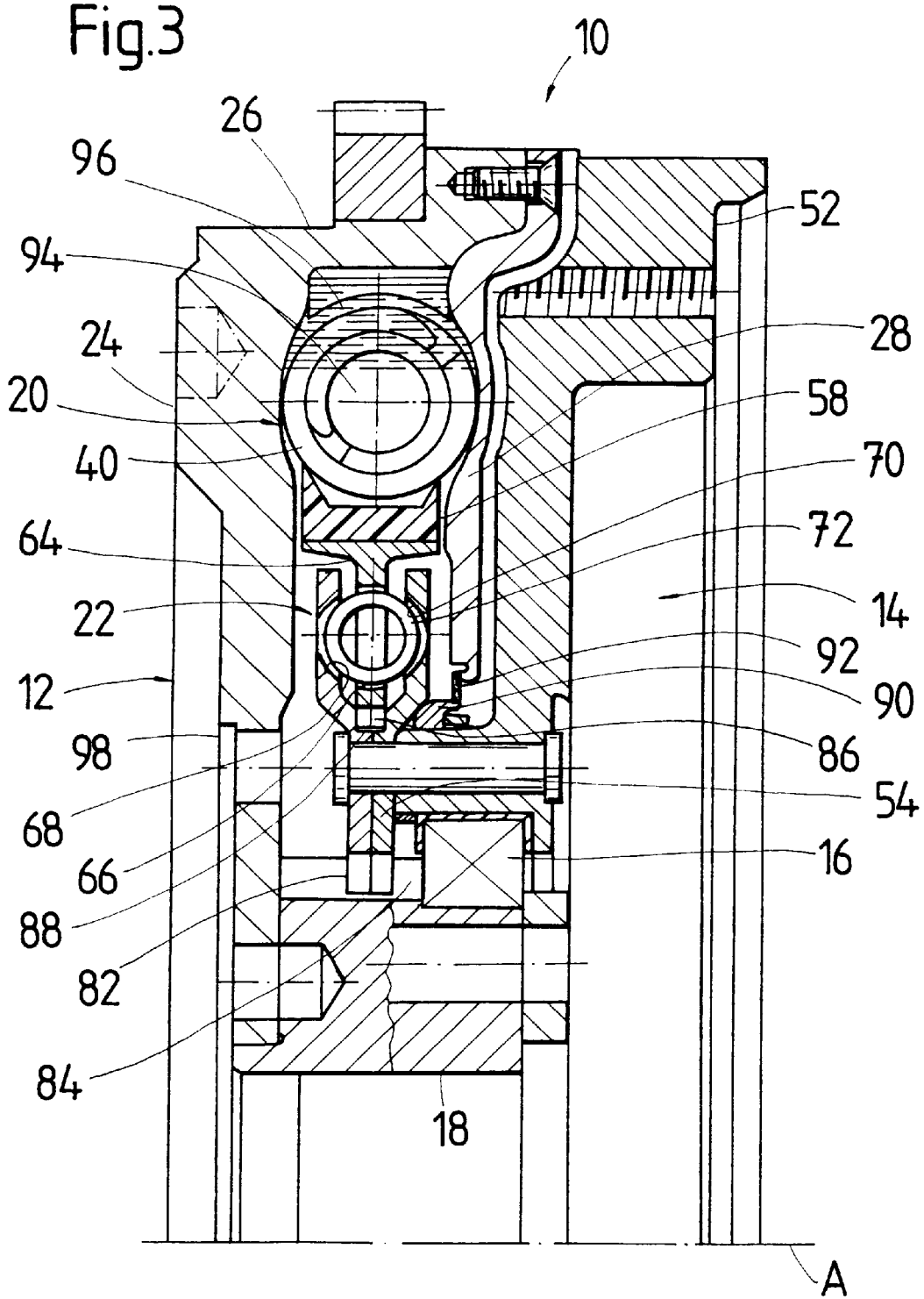
FIG. 3 is a view corresponding to FIG. 2 along Line III—III in FIG. 1.

FIGS. 1 to 3 show a first embodiment of a torsional vibration damper 10 according to the invention. The torsional vibration damper 10 comprises a first damper element 12, which, for example, can be connected in a radially inner area to a crank shaft (not shown) of an internal combustion engine, so as to form an input part during driving by means of the internal combustion engine. Further, the torsional vibration damper 10 comprises a second damper element 14, which is mounted rotatably relative to the first damper element 12 via a bearing 16 on an axial projection 18 securely connected to the first damper element 12. Between the first and second damper elements 12, 14, a first damping spring device 20 and a second damping spring device 22 act in the manner described below. That is, the first damper element 12 and the second damper element 14 are linked for the purpose of torque transmission by means of the first damping spring device 20 and the second damping spring device 22.

It should be noted that the term "element," as used here, describes not only one-part elements, but also elements composed of multiple parts, as the drawings show.

The first damper element 12 comprises a first substantially radially extending disk-like section or cover plate section 24, which is connected or connectable to the crank shaft on the radially inner side. A substantially axially extending cylinder-like section 26 is attached to the first disk-like section 24 on the radially outer side. A second disk-like section 28 is securely connected, for example, by screw bolts or the like, to the cylindrical or cylinder-like section 26 with its axial end distant from the first disk-like section 24 on the radial outside. The second disk-like section 28 extends radially inward and forms, for example, a second cover plate section. In its radially inner end area, the second disk-like section or cover plate section 28 is securely connected to the first disk-like section or cover plate section 24 by a plurality of bolts 30 or the like arranged at a distance from each other in the circumferential direction. On an inner circumferential surface 32 of the cylinder-like section 26, a displacement surface 34 is provided. On the first disk-like section 24 and the second disk-like section 28, there are support parts 36, which are located at a distance from each other in the circumferential direction, so as to extend axially toward each other from the respective disk-like sections. The support parts 36 can be securely riveted, welded or the like to the respective disk-like sections 24, 28. Further, the support parts can fill the entire axial intermediate space between the two disk-like sections 24, 28, i.e., can be embodied in one piece. The support parts 36 serve to support the respective damping spring arrangements 38 of the first damping spring device 20. That is, the first damping spring device 20 has multiple damping spring arrangements 38 extending in approximately the circumferential direction and arranged sequentially in the circumferential direction.

In the embodiment shown in FIGS. 1 to 3, each damping spring arrangement 38 is formed from or encompasses two damping springs 40. In the end areas of the damping spring arrangements 38 that lie in the circumferential direction, the damping springs 40 are supported via support elements 42 (described below) on the support parts 36, so that the individual damping springs 40 are slightly prestressed. In their adjacent end areas, the damping springs 40 are supported via a sliding shoe 44 that serves as an intermediate element. Upon torque transmission via the torsional vibration damper, both the sliding shoe 44 and the support elements 42, in the manner described below, can be moved in the circumferential direction with the respective displacement surface sections 46 and 48 along the displacement surface 34 on the first damper element 12. In such a displacement process of a support element 42 of the damping spring arrangement 38, the given support element 42 lifts up from the associated support part 36.

The second damper element 14 comprises a hub element 50, which is securely connected in a radially inner area, for example, to a flywheel component that forms the mass part 52 of a friction clutch. As shown in FIGS. 2 and 3, in particular, the hub element 50 comprises a first hub part 58 and a second, roughly fork-shaped hub part 54, which is linked via bolts 56 to the mass part 52. The second hub part 54, which is substantially fork-like in cross-section, forms cover plate sections 60, 62, between which is located a radial flange 64 of the first hub part 58. Spring windows 66, 68, 70 are embodied in the radial flange 64 and in the cover plate sections 60, 62 and have, in a known manner, control edges for damping springs 72 of the second damping spring device 22.

As the drawings show, the first damping spring device 20 and the second damping spring device 22 are thus effectively connected in series.

To permit transmission of a torque between the first damper element 12 and the second damper element 14 (i.e., the first hub part 58 of the second damper element 14), the first hub part 58 has an outer circumferential surface contour that is not rotationally symmetrical. In sections of the first hub part 58 corresponding to the circumferential end areas of the damping spring arrangements 38, there are ramp-like areas 74 projecting radially outward. In FIG. 1, for example, the radius of the first hub part 58 thus enlarges in both circumferential directions from a circumferential area of the first hub part 58 lying opposite to the sliding shoe 44 toward the ramp surface areas 74 up to their peaks. Likewise, the radial distance between the displacement surface 34 and the outer circumferential surface of the first hub part 58 decreases in the ramp surface areas 74.

As FIG. 1 also shows, the support elements 42 are embodied with a substantially wedge-shaped cross-section. That is, the displacement surface sections 46 each have a contour adjusted to the displacement surface 34, i.e., the sections 46 have a contour with the approximate shape of a circular segment. Correspondingly, the support elements 42 have radially inner carrier surfaces 76 that, when resting on the ramp surface areas 74, are parallel to these ramp surface areas 74, at least in areas. Because of the aforementioned reduction in radial distance between the ramp surface areas and the displacement surface 34, a wedge-shaped torque transmission arrangement is provided in the direction of the circumferential end areas of each damping spring arrangement 38. In other words, when the first hub part 58 in FIG. 1, and thus the second damper element 14, is turned clockwise relative to the first damper element 12, the ramp surface area 74 shown in the lower left of FIG. 1 takes along the associated support element 42 in the circumferential direction against the spring force effect of the damping spring 40. The two damping springs 40 connected in series are thereby compressed to a substantially equal extent. As a result, the sliding shoe 44 also moves clockwise in the circumferential direction. However, because the distance to the displacement surface 34 is reduced in the ramp surface area 74, and because the damping springs 40 press the support element 42 arranged at the lower left into this narrowing wedge-like intermediate space, the interaction of the ramp surface area 74 with the carrier surface 76 causes the support element 42 to be pressed radially outward against the displacement surface 34. This radially outward pressure becomes stronger, due to the compression of the damping springs 40, as the relative rotational angle between the first damper part 12 and the second damper part 14 increases. As a result, a frictional force is produced in the contact area between the displacement surface 34 and the displacement surface section 46 of a given support element 42. This frictional force increases as the relative rotational angle increases. In this way, a damping effect is achieved. Moreover, the damping effect can be reinforced by the fact that the displacement surface 34 does not have a circular configuration. For example, the displacement surface 34 can be configured with a radius decreasing from the circumferential end areas of a given damping spring arrangement 38 toward its central area. That is, when the first hub part 58 takes along one of the support elements 42, the latter moves with its support surface area 42 along a displacement surface 34 that moves increasingly radially inward. As a result, the radial distance between the ramp surface area 74 and the displacement surface 34 is increasingly reduced, and thus the wedge action and the frictional force production effect are strengthened.

The serial arrangement of the first damping spring device 20 and the second damping spring device 22 allows a graduated load-dependent damping operation to be provided. It is possible, for example, to embody the first damping spring device 20 with the damping springs 40 as the load damper and to embody the second damping spring device 22 with the damping springs 72 as the idle damper. In a substantially load-free state, in which the torque transmitted via the torsional vibration damper 10 does not yet suffice to compress the damping springs 40, torque fluctuations are dampened or intercepted by the rotation of the first and second hub parts 58, 54 relative to each other and by the concomitant compression of the damping springs 72. It is also possible to provide graduated operation here, in which case only some of the damping springs 72 are active initially, and a further set of damping springs 72 does not become active until a certain relative rotational angle is achieved between the first and second hub parts 58, 54. In FIG. 1, this is indicated by the fact that in the right-hand damping spring 72, for example, the spring windows 68, 70 of the cover plate sections 62, 60 have substantially the same circumferential extension as the spring window 66 in the first hub part 58, so that the damping spring 72 arranged in these spring windows becomes active starting at the minimum relative rotation between the first and second hub parts 58, 54. In contrast, in the case of the damping spring 72 shown in the bottom left of FIG. 1, each of the associated spring windows 68, 70 of the cover plate sections 62, 60 is embodied with a greater circumferential extension than the associated spring window 66 in the first hub part 58, so that only after a certain relative rotational angle is attained between the first and second hub part 58, 54 does this damping spring 72 become effective. The number of damping springs and the circumferential extension of the respective spring windows are selected in dependence on the desired damping characteristics.

An arrangement in which the respective spring windows in the cover sheet sections 60, 62 have a shorter circumferential extension, while the associated spring window 66 in the first hub part has a longer circumferential extension, is possible.

To prevent possible damage to the damping springs of the various damping spring devices 22, 20 when certain relative rotational angles are reached (i.e., upon introduction of certain torques), overload protection devices in the form of stops are provided. In FIGS. 1 and 2, for example, an overload protection device, i.e., a stop of the first damping spring device 20, is formed by the bolts 30, by means of which the first and second disk-like sections 24, 28 of the first damper element 12 are connected to each other on the radial inside. The bolts 30 penetrate openings, i.e., slots 78, extending in the circumferential direction in the cover plate sections 62, 60 of the second hub part 54. Further, the bolts 30 penetrate a slot-like opening 80 extending in the circumferential direction in the radial flange 64 of the first hub part 58. The circumferential extension of the opening 80 is thereby smaller than the circumferential extension of the openings 78. When a predetermined relative rotation occurs between the first damper element 12 and the second damper element 14 or first hub part 58, the bolts 30 come to rest on circumferential end sections of the respective associated openings 80, thus preventing further relative rotation between the first damper element 12 and the first hub part 58. The relative rotational angle at which such a stop prevents further relative rotation is preferably selected in such a way that, in this state, the damping springs 40 are not yet completely compressed, i.e., not yet set to "block."

FIG. 3 shows an alternative embodiment of an overload protection device for the first damping spring device 20. The second hub part has an internal circumferential toothing 82, which engages, with circumferential clearance, into a complementary external circumferential toothing 84 on the axially extending section 18. Thus, the intermeshing toothings 82, 84 permit an angular rotation of predetermined extent between the second damper part 54 and the section 18, and thus the first damper element 12. When this predetermined extent is reached, the respective toothings 82, 84 come to rest on each other and prevent further relative rotation.

It should be noted that an overload protection device could also be formed by sections of the support elements 42 or of the sliding shoe 44 that can be brought to rest on each other. Because at least the support elements 42 are preferably made of plastic, due to the sliding properties on the displacement surface 34, performing an overload protection function could damage the support elements 42.

The second damping spring device 22 also has associated with it an overload protection device. As described in reference to FIG. 3 in the case of the first damping spring device 20, this overload protection device is formed by an internal circumferential toothing 86 on the radial flange 64, which engages, with circumferential clearance, into a complementary external circumferential toothing 88 on the second damper part 54. When a certain relative rotation is attained between the first and second hub parts 58, 54, further rotation is prevented by the toothings 86, 88, which come to rest on each other.

To provide an additional damping effect independent of the relative rotational state, there is a friction device in the form of a friction ring 90, which is pressed in the axial direction toward the second hub part 54 by a prestress spring, for example, a cup spring 92. The cup spring 92 is supported on the radial inner end area of the second disk-like section 28 of the first damper element 12.

Moreover, as FIGS. 2 and 3 show, the first disk-like section 24, the cylinder-like section 26 and the second disk-like section 28 of the first damper element 12 form the borders of a lubricant chamber 94 that holds a lubricant 96, e.g., grease or the like. Upon rotation of the torsional vibration damper around the rotational axis A, the lubricant 96 builds up in the radially outer area. Thus, a lubricating function is provided for the displacement movement of the support elements 42 along the displacement path 34. This prevents the support elements 42 from becoming jammed due to the relatively strong area pressure between these components, especially in the area of heavy loads. Of course, the lubricant 96 and the respective surfaces that slide on each other, i.e., the displacement surface 34 and the displacement surface section 46, are adjusted to each other with respect to their friction properties in such a way that the desired friction damping force is produced in dependence on the relative rotational angle. In addition, the lubricant 96, into which the damping springs 40 of the first damping spring device 20 are at least partially immersed, provides a damping function, because the damping springs 40 must move, upon deformation, in a highly viscous fluid. The lubricant 96, which thus also produces a damping function, and the embodiment shown in FIGS. 1 to 3 of the damping spring arrangements 38 with two serially-connected damping springs 40, make it possible to obtain a damping characteristic that is aimed primarily at preventing resonance vibrations in the drive train, but also supplies outstanding vibration damping in other vibration frequency ranges. In particular, the speed-proportional damping made possible by the lubricant 96 reduces stress during load changes, i.e., in the event of a sudden reversal of the torque introduction direction.

It should also be mentioned that the lubricant chamber 94 is sealed toward the radial inside by the bearing 16, on the one hand, and by the friction ring 90 and the cup spring 92, on the other. The lubricant chamber 94 can be filled through a closeable opening 98.

Moreover, the lubricant chamber 94 can be filled with lubricant in such a way that the lubricant reaches radially inward to the area of the second damping spring device 22. Thus, the second damping spring device 22 can be also lubricated, and an additional damping function can be introduced with this second damping spring device 22 by the movement of the various components in a viscous fluid.

Figure 4:
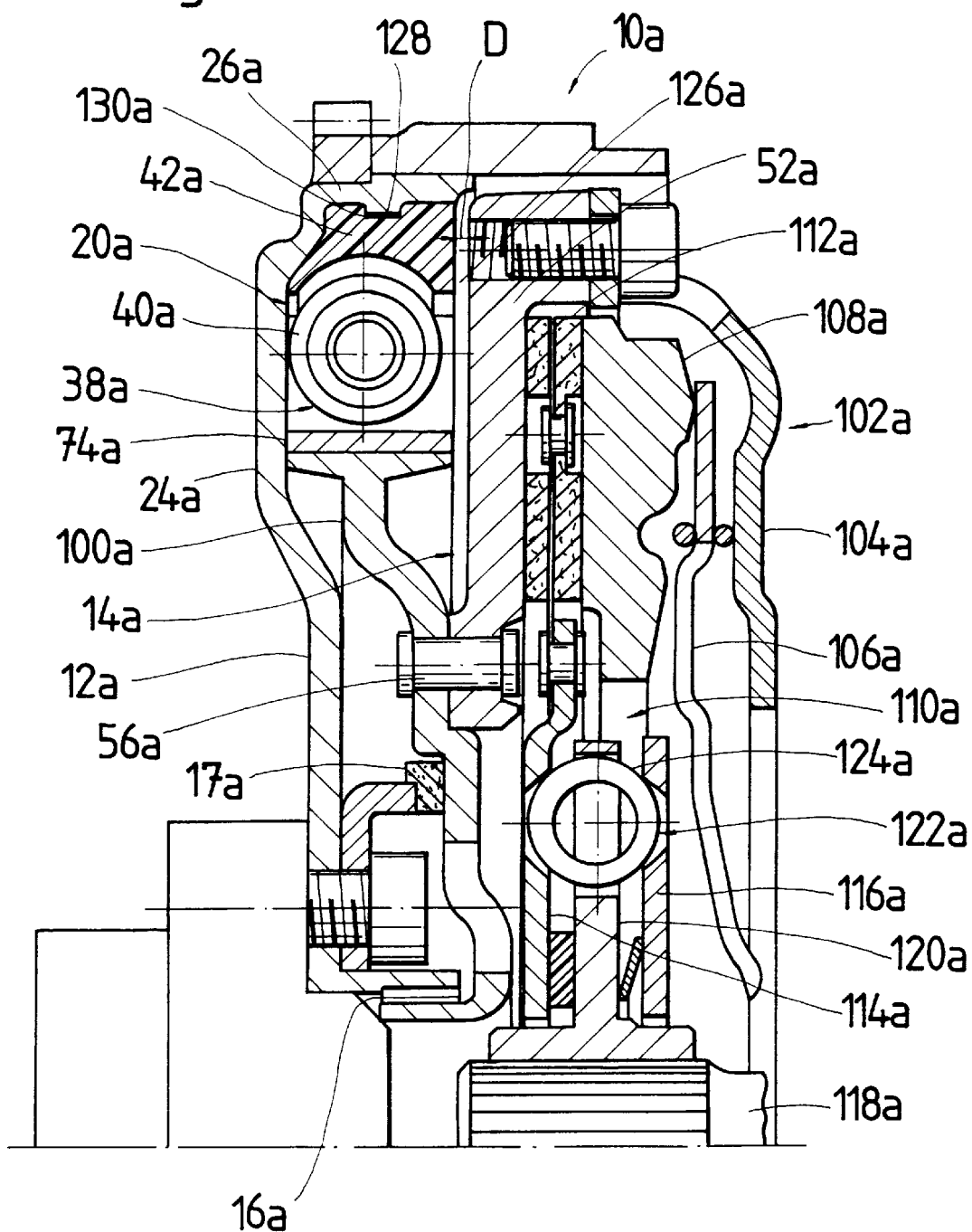
FIG. 4 is a view corresponding to FIG. 2 of a further embodiment of a torsional vibration damper according to the invention in connection with a motor vehicle friction clutch.

FIG. 4 shows an alternative embodiment of the torsional vibration damper according to the invention. Components of the torsional vibration damper shown in FIG. 4 that correspond to components already described in reference to FIGS. 1 to 3 are identified by the same reference numbers followed by the suffix "a." The differences of the embodiment in FIG. 4 from those described above are discussed below.

The first damper element 12a again comprises a first disk-like and approximately radially extending section or cover plate section 24a, which is connected on the radial outside to the cylinder-like section 26a; being embodied, for example, in one part therewith. However, on the axially opposite side of the cylinder-like section 26a, there is no second cover plate section or disk-like section. Rather, lying directly and at a predetermined distance D across from the respective support elements 42a or damping spring arrangements 38a with their damping springs 40a is the mass part 52a of the second damper element 14a. The mass part 52a is connected in a rotation-proof fashion by several bolts 56a to a hub part 100a (here embodied in one piece), which again can have, in its radially outer area, the ramp surface areas 74a. It should be noted that the ramp surface areas 74a can be embodied as one piece with the hub part 100a, or can comprise separate elements or a separate ring section, which is/are then connected to the hub part 100a in a rotation-proof fashion. This also applies to the above-described embodiments and all subsequently described embodiments of the torsional vibration damper according to the invention. Furthermore, the hub part 100a is rotatably mounted on the first damper element 12a by means of an axial bearing 17a.

As FIG. 4 shows, a motor vehicle friction clutch 102a is connected to the mass part 52a in a known manner. The friction clutch has a housing 104a, which is connected in a rotation-proof fashion on the radial outside to the mass part 52a by means of several bolts. Resting on the housing 104a in a known manner is an energy storage device in the form, for example, of a diaphragm spring 106a. In the engaged state, the diaphragm spring 106a presses a pressure plate 108a in the direction of the mass part 52a. In this state, a clutch disk 110a with friction linings 112a is clamped between the pressure plate 108a and the mass part 52a for the purpose of torque transmission. The clutch disk 110a has two disks or cover plate parts 114a, 116a. The friction linings 112a are connected to the disk part 114a. The two disk parts 114a, 116a are securely connected to each other by means of bolts (not shown) or the like. Arranged between the two disk parts 114a, 116a is a hub ring section 120a connected in a rotation-proof fashion to a gear input shaft 118a. The hub ring section 120a is linked to the disk parts 114a, 116a via a damping spring device 122a with multiple damping springs 124a for the purpose of torque transmission. The damping spring device 122a has a known structure. Specifically, it can have the same structure as the second damping spring device 22 shown in FIGS. 1 to 3. That is, in the embodiment in FIG. 4, the damping spring device 122a can function as an idle damper and, in the engaged state of the clutch 102a, is again connected in series to the first damping spring device 20a. Thus, the idle damping function is moved in this case from the area of the second damper element 14a into the area of the clutch disk 110a. This permits a one-part embodiment (not shown in FIG. 4) of the entire second damper part 14, for example, from a casting. Thanks to the reduced number of parts, a cost reduction can be also achieved.

It should be mentioned that the serial connection of multiple damping spring devices, as shown in the embodiment in FIG. 1, permits a reduction in the c-value and thus allows better vibration uncoupling. The particular load area in which the various damping spring devices are effective can be adjusted to the desired vibration damping characteristics. Thus, it is also possible for the damping spring device 122a, like the second damping spring device 22 in FIG. 1, to constitute a high-load damper that does not become effective until the damping capacity of the first damping spring device 20 is exhausted. It should also be mentioned that the different damping spring devices are embodied in such a way that their respective effective ranges overlap or follow one another directly.

Further, it is also possible for multiple damping spring devices, for example, load and idle damping devices, to be connected in series in the clutch disk 110a. The installation of a rigid, non-damping clutch disk is also possible.

The torsional vibration damper 10a shown in FIG. 4 is the dry-running type. This means that the area in which the support elements 42a and the first damping spring device 20a are arranged is open on one axial side, i.e., toward the mass part 52a. To allow the heat absorbed during operation of the clutch 102a, especially in the area of the mass part 52a, to be extracted to the outside, an air gap 126a is provided. However, because there is no second disk-like section on the first damper element 12a, a guide projection 128 is provided on the cylinder-like section 26a. The guide projection 128 in embodied in encircling fashion in the circumferential direction and engages into complementary guide recesses 130a in the support elements 42a. Thus, axial securing means are formed for the support elements 42a. This prevents the support elements 42a from moving axially during operation and coming to rest on the mass part 52a. Because the support elements 42a are preferably made of plastic, as mentioned above, contact with the mass part 52a, which becomes heated during clutch operation, could damage the support elements 42a. It should be mentioned that the guide projection 128 need not extend completely in the circumferential direction, but must be provided, specifically, only in the areas in which the support elements 42a move.

The embodiment shown in FIG. 4 omits a component on the first damper element 12a, namely, the second disk-like section, and thus omits a production step as well. This embodiment can therefore be constructed more simply and economically. The damping effect of a lubricant or the like, also omitted, can be compensated for by the provision of the damping spring device 122a in the clutch disk.

To further adjust the vibration damping performance, it is also possible, in the embodiment shown in FIG. 4, to embody the hub element 100a of the second damper element 14a in the same manner as described with reference to the embodiment in FIG. 1; i.e., a damping spring device can also be provided in this area.

Figure 5:
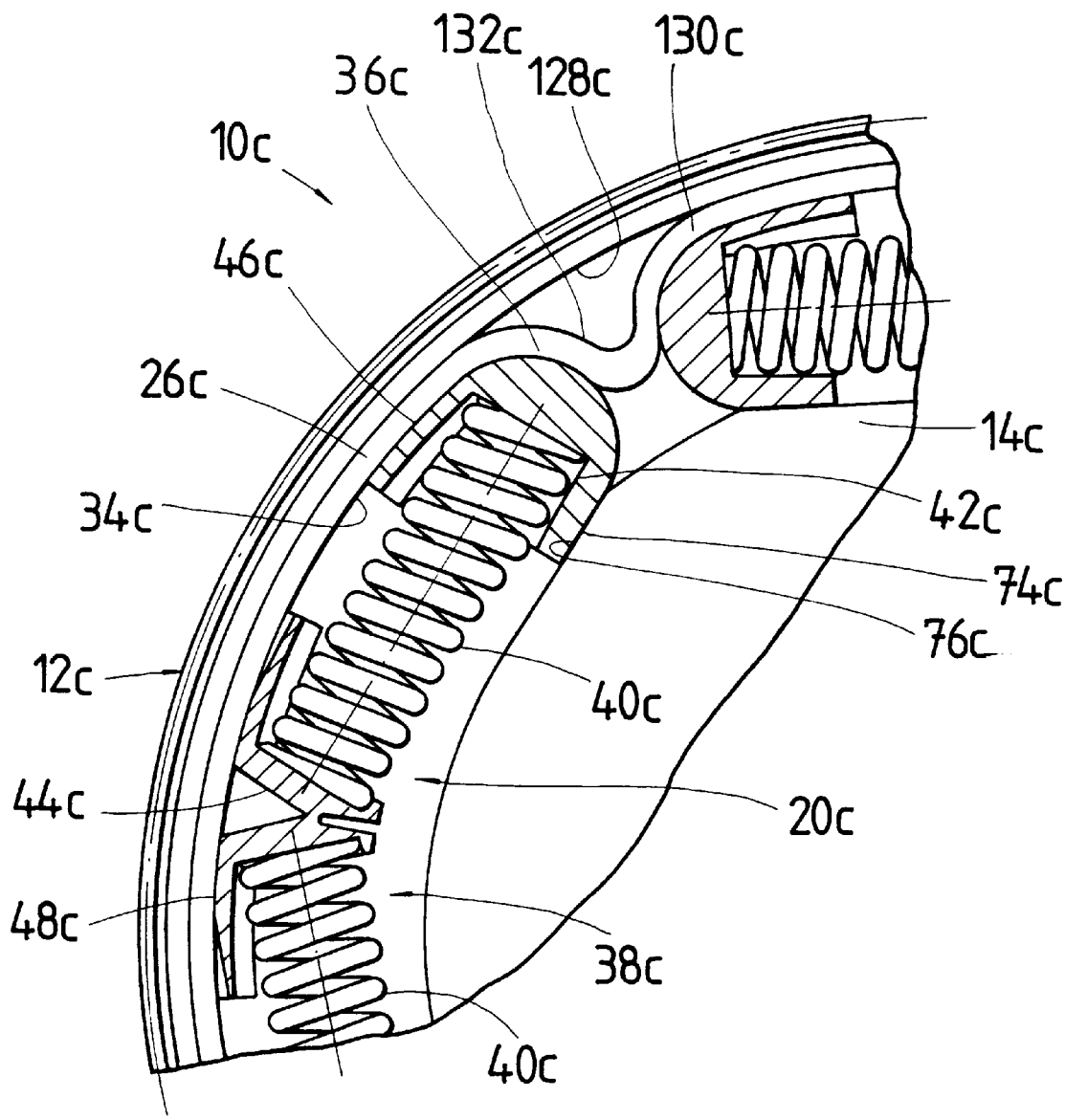
FIG. 5 is a partial cross-sectional view of another embodiment of a torsional vibration damper according to the invention.

FIG. 5 shows a further alternative embodiment of a torsional vibration damper according to the invention. Components that correspond to those shown in FIGS. 1 to 3 are identified by the same reference numbers, followed by a "c."

The torsional vibration damper in FIG. 5 differs specifically with respect to the structure of the first damper element 12c. In the area of the cylinder-like section 26c, this first damper element 12c has a ring 130c, which extends in the circumferential direction and is preferably closed. The ring 130c lies, under prestress, on an inner circumferential surface 128c of the cylinder-like section 26c. The prestress can be result from the size of the ring 130c, on the one hand, and the force action of the damping spring arrangements 38c on radial impressions 132c of the ring 130c, on the other. The impressions 132c form the support parts 36c for the support elements 46c. The force action of the individual damping springs 40c in approximately the circumferential direction presses the ramp-like radial impressions 132c radially outward against the inner circumferential surface 128c of the cylinder-like section 26c. The displacement surface 34c for the support elements 46c is the inner circumferential surface of the ring 130c. Thanks to the provision of the ring 130c, which is movable in the circumferential direction relative to the cylinder-like section 26c, a slip clutch arrangement is formed. Based on the aforementioned prestress effect and the particular surface configuration of the ring 130c, on the one hand, and on the cylinder-like section 26c, on the other, the slip clutch arrangement has a certain slip moment. The slip moment corresponds to the maximum torque transmissible via this slip clutch arrangement without slip of its individual components. If this maximum transmissible torque is exceeded, as can happen, for example, when torque peaks occur due to a sudden reversal of thrust, then the slip clutch arrangement is brought into a slip state, i.e., the ring 130c moves, together with all of the components that follow it in the power flow direction, relative to the cylinder-like section 26c. The accompanying transition to a state of slide friction results in a reduction in the slip moment, so that torque peaks that occur can be effectively intercepted. If the torque to be transmitted is again reduced, the slip state is discontinued, and the adhesive friction state that then exists again between the ring 130c and the cylinder-like section 26c permits normal torque transmission.

Along with the aforementioned advantage of torque peak damping, the embodiment in FIG. 5 offers the advantage that single support parts need not, as in the embodiments in FIGS. 1 to 3, be connected to other components. However, it should be noted that the individual support parts, even in the embodiments in FIGS. 1 to 4 and the subsequently described embodiments, can be formed, for example, by axial impressions or radial impressions on the first damper element.

Figure 6:
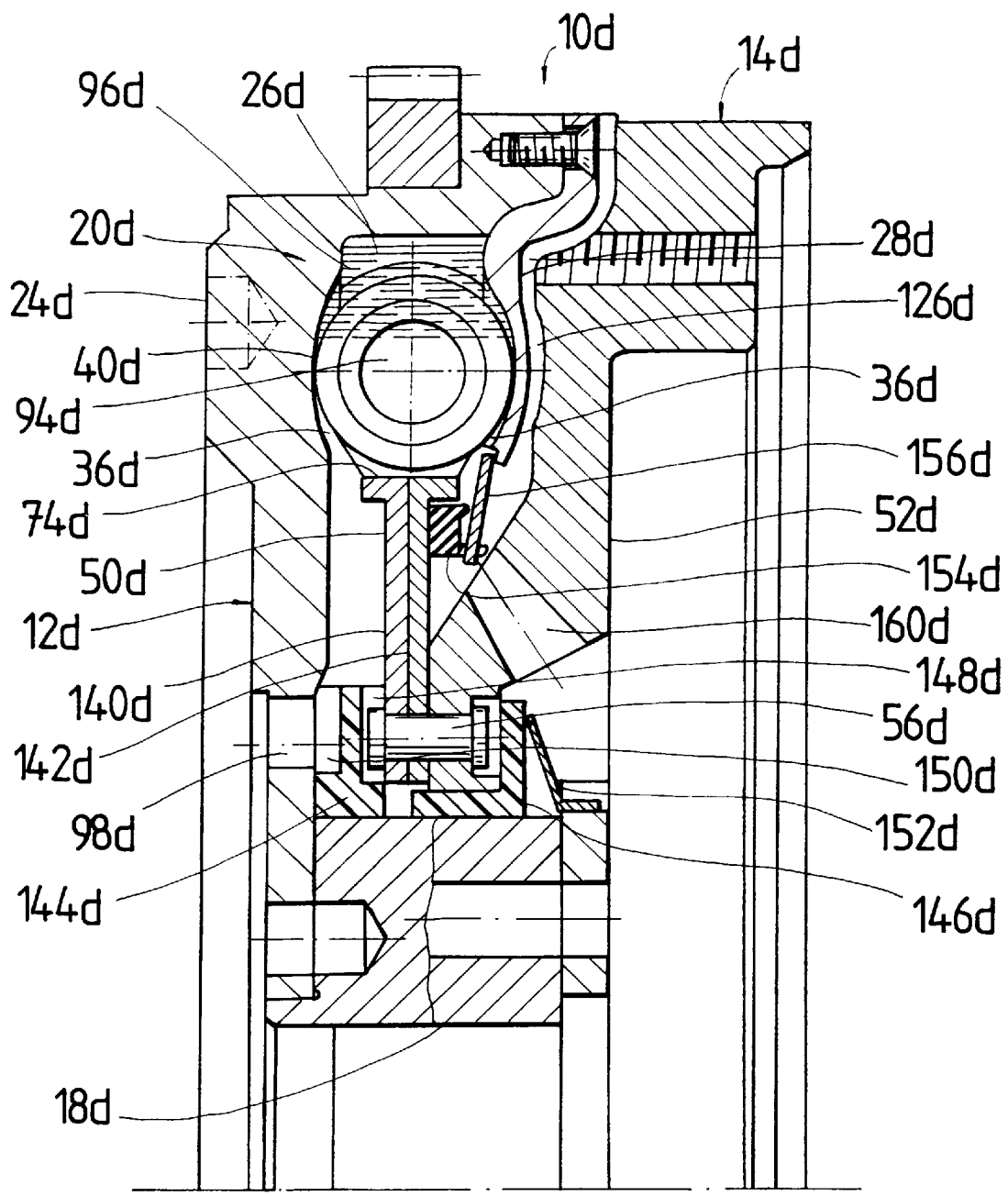
FIG. 6 is a partial longitudinal sectional view of still a further embodiment of a torsional vibration damper according to the invention with a lubricant chamber.

FIG. 6 shows a further alternative embodiment of the torsional vibration damper according to the invention. Components that correspond in embodiment or function to those described in FIGS. 1 to 3 are identified by the same reference numbers, followed by a "d." The substantial differences compared to the embodiments in FIGS. 1 to 3 are discussed below.

The embodiment in FIG. 6 again comprises the first damping spring device 20d, which acts between the first and second damper elements 12d, 14d. The damping spring device 20d has multiple damping springs 40d, which are supported in the circumferential direction via support elements (not shown in the drawing) on the support parts 36d. The ramp surface areas 74d for taking along the support elements in the circumferential direction are again embodied radially outside on a hub element 50d. As shown in FIG. 6, the hub element 50d is composed basically of two hub disk elements 140d, 142d, which are attached to the mass part 52d on the radial inside by the bolts 56d. These elements of the components forming the second damper element 14d are mounted in the region of the connection of the hub disk elements 140d, 142d to the mass part 52d. A second bearing 146d, which acts both radially and axially, is mounted rotatably on the first damper element 12d and the section 18d. The first and second bearings 144d, 146d are formed substantially by slide bearing rings. The slide bearing ring that forms the first bearing 144d has several axial openings 148d, into which heads of the bolts 56d can engage, thus taking along this first bearing 144d in the circumferential direction. Further, the first bearing 144d has a depression 150d, through which lubricant 96d can be introduced via the opening 98d into the lubricant chamber 94d. The second bearing 146d is embodied with a substantially L-shaped cross-section and is prestressed by an energy storage device, e.g., a cup spring 152d, in the direction of the first bearing 144d, thus holding the second damper element 14d in the axial direction.

As FIG. 6 shows, the two hub disk elements 140d, 142d are formed from individual sheet metal parts, which can be produced, for example, in a deep-drawing process. Because the embodiment is symmetrical, only a single type of hub disk element needs to be formed, which then can be used for both the hub disk element 140d and the hub disk element 142d. Compared to an embodiment of the hub disk element 50d made from cast material, this brings considerable cost advantages, due to the omission of expensive machining steps, for example, in the area of the ramp surface areas 74d. It should be noted that, for example, the first damper element 12d can also be embodied from deep-drawn sheet metal parts. The first disk-like section 24d with the cylinder-like section 26d can thus be formed integrally in a deep-drawing process as a sheet metal part, for example. Alternatively, it is also possible to manufacture these two sections separately and then connect them by welding, rivets, screws or the like. The embodiment of one of these parts as a cast part and the other as a sheet metal part is also possible.

The seal of the lubricant chamber 94d is formed on one axial side (namely, the left side in FIG. 6) by the bearing 144d. On the other axial side (namely, the right side in FIG. 6), the seal is provided by a sealing disk 154d, which rests on the hub disk element 142d and is prestressed by a friction ring 156d supported radially outside on the second disk-like section 28d. The sealing disk 154d and the friction ring 156d are connected to each other in their contact area in a rotation-proof manner, so that the hub disk element 50d, as well as the sealing disk 154d rotating with the latter, causes the friction ring 156d to be taken along for the purpose of rotation and therefore to rub against the second disk-like section 28d. It is similarly possible for a frictional force to be produced by means of relative rotation between the hub disk element 50d and the sealing disk 154d. This friction can again contribute, independently of the relative rotational angle, to the vibration damping.

FIG. 6 also shows that air openings 160d are embodied in the mass part 52d. The openings 160d lead to the gap 126d between the first damper element 12d and the second damper element 14d, and thus result in a fast extraction of the heat absorbed in the torsional vibration damper 10d.

It should again be noted that the embodiment of the lubricant chamber 94d with the lubricant 96d located therein offers the advantage of speed-proportional damping, i.e., there is lubricant even in the area where slide movements occur. Particularly in engines with fewer cylinders, e.g., 3 and 4 cylinder engines, this leads to clearly better damping in the range of the resonance frequency, which can be significantly above the ignition frequency of the engine. It is therefore possible to dispense with a further damping spring unit, for example, in the area of the hub disk element 50d.

Figure 7:
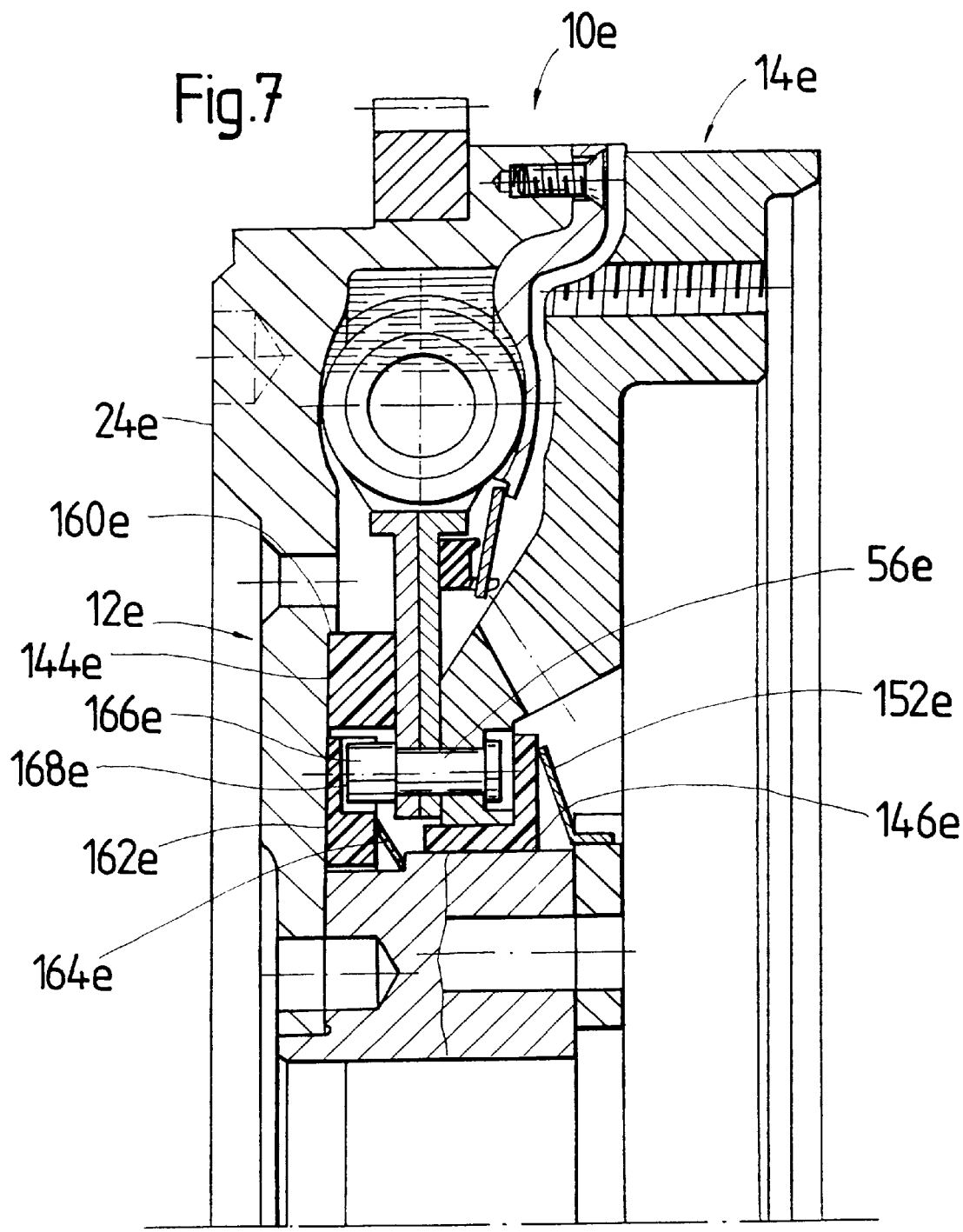
FIG. 7 is a view corresponding to FIG. 6 of a further embodiment with an entrained frictional force production device.

FIG. 7 shows a further development of the torsional vibration damper in FIG. 6, particularly in the area of the bearing of the two damper elements on each other. Components described previously are identified with the same references number and an added "e." Only the differences compared to the embodiment in FIG. 6 are addressed below.

In the embodiment in FIG. 7, the first bearing 144e is moved radially outward, where it is supported on a circumferential shoulder 160e. In the radially inner area, i.e., the area in which the bolts 56e lie, there is a friction ring 162e, which is prestressed by a spring, e.g., the cup spring 164e, and presses against the first disk-like element 24e. This allows a frictional braking force to be produced in the contact area of the friction ring 162e with the disk-like element 24e. The heads 166e of the bolts 56e engage into recesses 168e provided in the friction ring 162e. The recesses 168e have a predetermined circumferential extension that permits the heads 166e to move freely in the recesses 168e within a certain circumferential range without coming to rest on end surfaces of these recesses. However, if an excessively strong relative rotation takes place between the first and second damper elements 12e and 14e, as can occur, for example, in the event of torque peaks, the heads 166e come to rest on the surfaces limiting the recesses 168e in the circumferential direction and then take the friction ring 162e along in the circumferential direction. As already discussed, a frictional damping force is thereby produced, which helps to dampen torque peaks. The torsional vibration damper 10e shown in FIG. 7 thus has an entrained friction device that is not effective at smaller rotational angles, but becomes effective when a particular threshold rotational value is reached, and then contributes to the interception of torque moment peaks by producing a frictional force.

Figure 8:
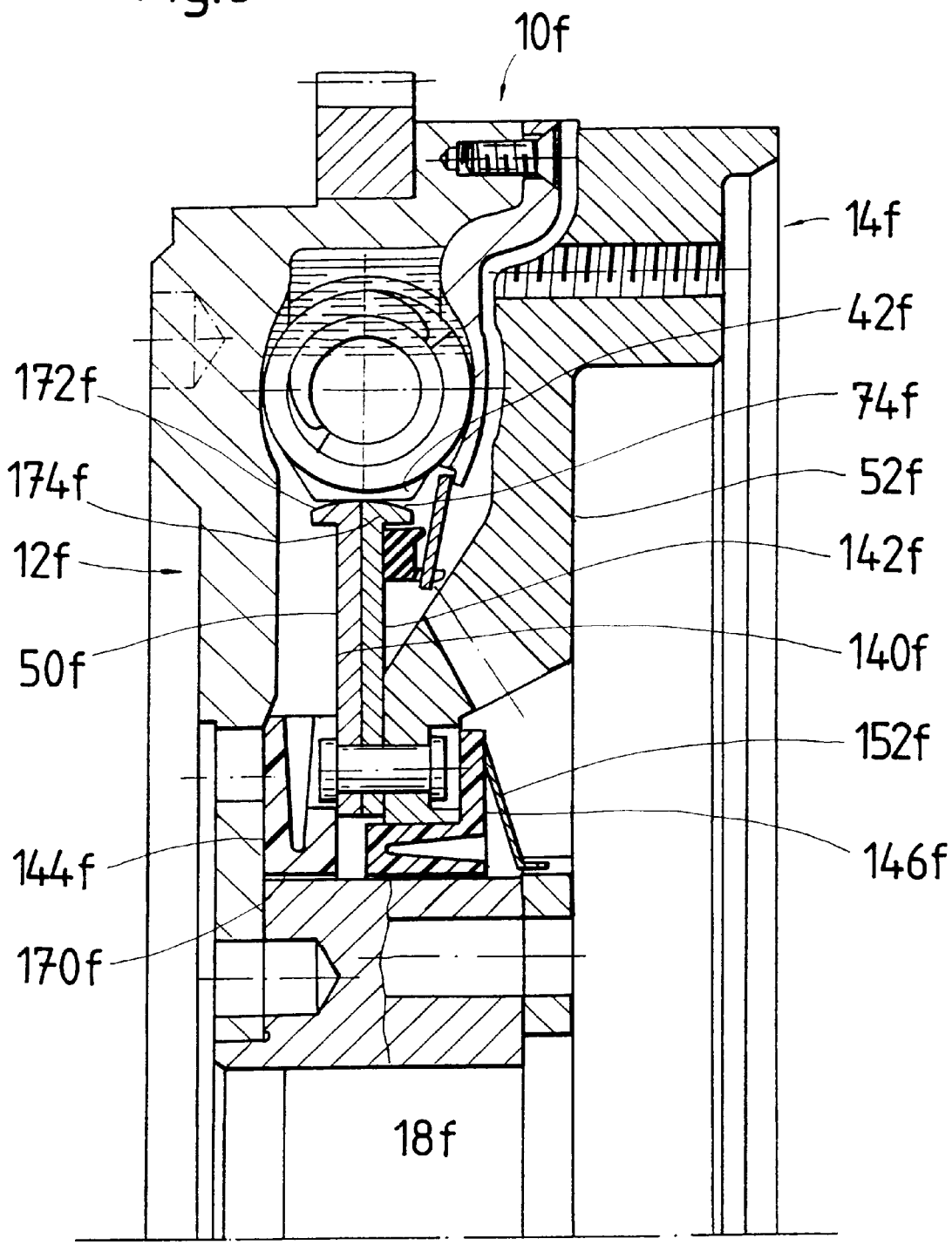
FIG. 8 is a view corresponding to FIG. 6 of yet another embodiment of a torsional vibration damper with damper elements that can wobble relative to each other.

FIG. 8 shows a further development of the embodiments shown in FIGS. 6 and 7. Components that correspond in embodiment or function to those described above are identified by the same reference numbers, with an added "f."

When the torsional vibration damper 10f is used as a dual-mass flywheel for a motor vehicle friction clutch, for example, the first damper element 12f is connected in a rotation-proof fashion to a crank shaft. The second damper element 14f is connected to a gear input shaft in a rigid and rotation-proof manner via a motor vehicle friction clutch located in the engaged state on the mass part 52f. If a slight offset or slanted position exists between the crank shaft and the gear input shaft, or if wobbling movements of the crank shaft are produced during operation of the internal combustion engine by a deformation of the crank shaft resulting from the individual action points of the piston rods, a wobbling movement of the first and/or second damper element 12f, 14f can result, or a radial displacement of these two components relative to each other can occur. This in turn leads to an excessive load on the bearing arrangement of the two components, which bearing arrangement often cannot be adequately lubricated, because the relative rotation between the components has a limited rotational angle. Thus, in the embodiment in FIG. 8, the two bearings 144f and 146f make it possible for the first damper element 12f and the second damper element 14f to carry out a wobbling movement relative to each other. For this purpose, the two bearings are formed from elastically deformable bearing rings that have, as FIG. 8 shows, a substantially V-shaped cross-section. If the two damper elements 12f, 14f undergo a tilting movement relative to each other, the result is an elastic deformation of the two bearings 144f, 146f (i.e., of the bearing rings themselves), so that excessive stress in the bearing area can be avoided. Moreover, the prestress spring 152f is embodied softly enough to be able to follow such a wobbling movement while maintaining its prestress effect.

To further assist the wobbling capability, the mass part 52f, which supports the second damper element 14f on the bearing 146f, is embodied in a convex fashion on its bearing surface 170f. When a wobbling movement occurs, this embodiment also permits a rolling movement to occur in the bearing area of the mass part 52f on the bearing 146f, further relieving the bearing. In the same way, the hub disk elements 140f, 142f, in their radially outer areas that form the ramp surface areas 74f, are embodied with convex surface areas 172f, 174f, seen in longitudinal section. As a result, upon relative tilting of the first and second damper elements 12f, 14f, a rolling movement can also take place on the respective support elements 42f.

Figure 9:
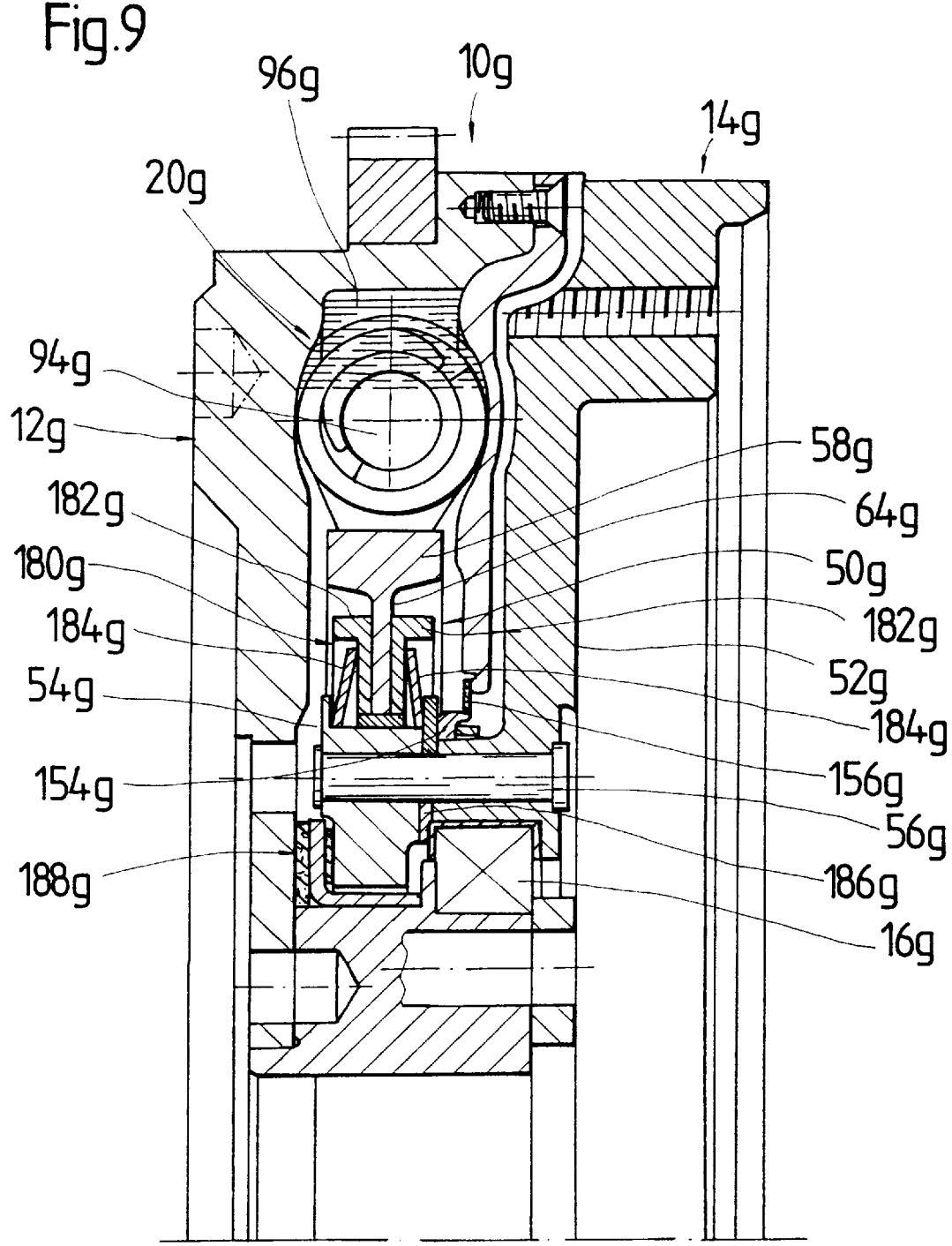
FIG. 9 is a partial longitudinal sectional view of an embodiment of a torsional vibration damper according to the invention with a slip clutch for overload protection.

FIG. 9 shows a further alternative embodiment of the torsional vibration damper according to the invention. Components that correspond to components already described are identified by the same reference numbers with an added "g." The essential structural differences of this embodiment are discussed below.

In the embodiment in FIG. 9, the hub disk element 50g again comprises a first hub disk part 58g arranged radially outside, as well as a second hub disk part 54g arranged radially inside and connected to the mass part 52g by bolts 56g. A slip clutch arrangement 180g acts between the first and second hub disk parts 58g and 54g. The slip clutch arrangement 180g comprises two slip clutch friction rings 182g located on the two axial sides of the radial flange 64g of the first hub disk part 58g. These slip clutch friction rings 182g are axially prestressed by energy storage devices, e.g., cup springs 184f, which rest, respectively, on radial projections embodied on the second hub disk part 54g or an intermediate ring part 186g substantially securely connected to the hub part 54g, and which thus press the slip clutch friction rings 182g against the radial flange 64g. The cup springs 184g can act on the hub disk part 54g or on the intermediate ring part 186g in a rubbing manner or can be connected thereto in a rotation-proof manner. As already described in reference to FIG. 5, the slip clutch arrangement 180g has a damping effect for intercepting torque peaks. If excessively large torques that could damage components themselves or the drive system are transmitted into the torsional vibration damper, it is possible to adjust the slip moment of the slip clutch arrangement 180g so as to permit slip between the first damper element 12g (together with the first hub disk part 58g) and the second hub disk part 54g (together with the mass part 52g). Because of this possible slip, torque peaks are not transmitted past the torsional vibration damper 10g.

As FIG. 9 shows, the lubricant chamber 94g is again sealed (on the right side of the drawing) by a sealing ring 154g, which is prestressed by a cup spring that serves as the energy storage device 156g. The sealing ring 154g thereby lies on the intermediate ring part 186g. As FIG. 9 also shows, a friction device 188g that acts between the second hub disk part 54g and the first damper element 12g is embodied with a friction ring and a prestress spring. This friction device 188g produces a frictional force, independent of the rotational angle, that contributes to the damping of torsional vibrations.

The slip clutch arrangement 184g does not necessarily have to have the symmetrical design shown in FIG. 9. For example, it is conceivable to omit one of the friction rings and to furnish the prestress by the other friction ring alone. An embodiment with several parallel-connected friction surfaces in the manner of a lamella clutch is also possible if, for example, the torsional vibration damper is to be used with heavy loads.

FIGS. 10 to 15 show various possible embodiments of the damping spring arrangements that can be used in the first damping spring device that performs the load damping function.

FIG. 10 again shows, on the left, the basic structure of the damping spring arrangement 38 with the two damping springs 40 as shown in FIG. 1. Via the support elements 42, the two damping springs 40 rest, in their end areas lying in the circumferential direction, on the support parts 36 of the first damper element 12. As FIG. 11 shows, the support elements 42 have a body 192 with a substantially circular contact surface 190 for resting on the respective support parts 36, away from which body 192 two spring elements 194, 196 extend. Between these spring elements 194, 196, there is a recess 198 with a substantially circular cross-section for holding and guiding the ends of the damping springs 40. Embodied on the spring 194 is the displacement surface section 46 for movement on the displacement surface 34. Embodied on the spring 196 is the carrier surface area 76, on which the respective ramp surface areas 74 of the second damper element 14 can come to rest. Of course, the displacement surface section and the carrier surface area 76 can both extend into the area of the body 192. The support element 42 is preferably made of plastic, due to its sliding properties and economic feasibility.

Figure 10:
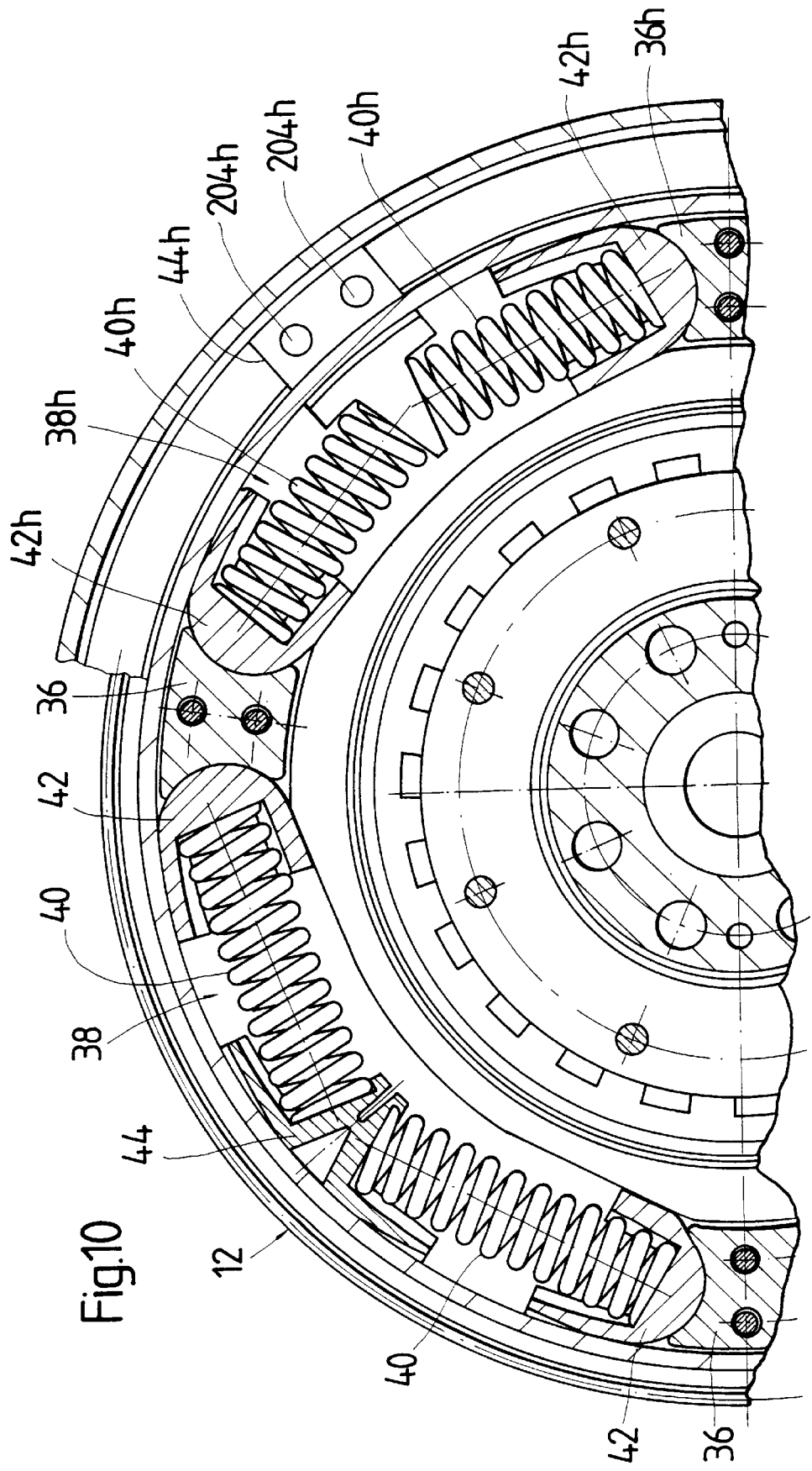
FIG. 10 is a partial cross-sectional view of a torsional vibration damper presenting different embodiments of intermediate elements for the damping spring arrangements.

As FIG. 10 also shows, the sliding shoe 44 is again arranged between the facing ends of the damping springs 40. Due to the straight-lined embodiment of the damping springs 40, which function as helical compression springs, the sliding shoe 44, during compression of the damping spring arrangement 38, provides a force deflection in approximately the circumferential direction.

The right half of FIG. 10 shows an alternative embodiment of a damping spring arrangement, in particular, an alternative embodiment in the area of the sliding shoe. Components that correspond to components already described are identified by the same reference numbers with an "h" added.

In the embodiment shown on the right in FIG. 10 and in FIG. 12, the sliding shoe 44 on the left half is replaced by an intermediate element 44*h*, which runs, without rubbing, in the circumferential direction. In addition, as FIG. 12 shows, a ring space 200*h* is embodied in the transitional area between the cylinder-like section 26*h* and the second disk-like section 28*h*. The ring space 200*h* accommodates a carrying ring 202*h* with movement clearance radially outward as well as radially inward. The respective intermediate elements 44*h* for the various damping spring arrangements 38*h* are attached to the carrying ring 202*h* by means of bolts 204*h*. The intermediate elements 44*h* have a substantially S-shaped or Z-shaped configuration and extend from the ring space 200*h* into the area in which the damping springs 40*h* are located. In general, several damping spring arrangements 38*h* are provided at an equal circumferential distance to each other; specifically, at least three damping spring arrangements, each with a circumferential space of 120°, are preferably provided. The intermediate elements 44*h* securely connected to the carrying ring 202*h* thus provide a self-centering function for the module composed of the carrying ring 202*h* and the intermediate elements 44*h*. The reason for this is that the individual damping springs 40*h* in the torsional damper are arranged roughly tangential to a circle that encompasses the rotational axis A. The individual damping springs 40*h*, with their end areas, therefore produce a force component directed radially outward, which is also transmitted to the individual intermediate elements 44*h*. Due to the symmetrical embodiment, these radially outwardly directed forces reciprocally balance each other, so that the intermediate ring 202*h* is carried or rotatably run in the ring space 200*h* without contacting any parts. Such an embodiment is especially advantageous in the case of dry-running torsional vibration dampers, because friction can be prevented at least in the area of the intermediate elements 44*h*.

As FIG. 12 shows, the cylinder-like section 26*h* and the second disk-like section 28*h* are connected to each other by welding. Rivets, screws or the like could also be used here. For reasons of cost, the intermediate elements 44*h* and the carrying ring 202*h* are preferably composed of sheet metal parts. A plastic embodiment is also conceivable.

FIGS. 13 and 14 show an alternative embodiment of the carrying ring with the intermediate elements. Components that correspond to components described above are identified by the same reference numbers, with an "i" added.

In this embodiment, the carrying ring 202*i* is embodied in one piece with the intermediate elements 44*i* and is radially located in approximately the area where the intermediate elements are also located. This embodiment has a very compact structure. For example, the carrying ring 202*i* can be produced with the intermediate elements 44*i* from plastic in a casting process. A metal embodiment is also possible.

In principle, an embodiment of the torsional vibration damper according to the invention is also possible in which the respective damping spring arrangements comprise only a single damping spring. Such an embodiment is shown in the left half of FIG. 15. Components that correspond to components previously described are identified by the same reference number, with a "k" added. In this embodiment, the damping spring 40*k* of the damping spring arrangement 38*k* has, in the relaxed state, the substantially straight-line configuration of a helical compression spring, as shown schematically on the outer left. However, the damping spring arrangement 38*k* is installed in the torsional vibration damper 10*k* in a slightly curved manner, as also shown in the left half of FIG. 15. This curved installation state results from the fact that, in the load-free state, the contact surfaces 210*k* of the support elements 42*k* or 212*k* of an intermediate element 44*k* have the respective inclination angles α and β relative to the straight-line embodiment of the damping spring 44*k*. It should be noted that this inclined embodiment of the contact surfaces is possible in the aforementioned embodiment of a damping spring arrangement 38*k* with a single damping spring 40*k* as well as in an embodiment with multiple damping springs and additional intermediate elements 44*k*.

As a result of the inclined arrangement of the contact surfaces 210*k* and 212*k*, the damping springs 40*k*, in the load-free state, are initially more strongly prestressed radially inside than radially outside. As compression increases, however, the radially outer area also becomes more strongly compressed, so that in the maximum compressed state, the damping springs 40*k* are in the evenly compressed state shown on the top left of FIG. 15. A progressively changing spring characteristic is thus provided in the individual damping spring arrangements 38*k*, so that the maximum possible deformation path for the individual springs 40*k* is used. The angles α and β do not necessarily have to be equal to each other. Further, as the left part of FIG. 15 shows, a graduated embodiment at least of one of the contact surfaces 210*k* or 212*k* is possible, so that in the load-free state the radially inner area of the damping springs 40*k* is additionally more strongly prestressed than the radially outer area. The gradation can be selected in such a way that, in the load-free state, the radially outer area of the springs 40*k* is not yet substantially prestressed, and does not contribute to damping by contact with the radially outer area set back in the circumferential direction until the relative rotation increases. It should be noted that instead of the graduated embodiment, a substantially straight-line surface positioned in a suitably slanted fashion can be provided.

The right half of FIG. 15 shows a further alternative embodiment of the damping spring arrangement. Components that correspond in function to components already described are identified by the same reference numbers, with an "l" added.

In the embodiment in the right half of FIG. 15, the support elements 42l have no spring tongues or the like. Instead, the support elements 42l form substantially straight contact surfaces for the damping springs 40l. Each damping spring arrangement 38l comprises only a single damping spring, which is preferably curved in its load-free state. The damping spring 40l is again supported at opposite ends in the circumferential direction on the respective support elements 42l (and thus the support parts 36l) of the first damper element 12l. In their radially outer area, the damping springs 40l rest on a spring shell 220l, which also functions as the displacement surface 34l for the support elements 42l. Because the damping spring 40l is supported in its radially outer area, an additional friction component is introduced and contributes to vibration damping. The contact force of the damping springs 40l on the spring shell 220l increases as compression increases, i.e., as the relative rotational angle increases, on the one hand, and as centrifugal force, i.e., speed, increases, on the other. In this way, a frictional force component that depends both on the torque to be transmitted and on the current speed is furnished. The embodiment shown in the right half of FIG. 15 is advantageous, in particular, for accommodating or decoupling large torques. The damping spring arrangements 38l can have an angular extension equal to approximately 180°, so that the damping spring device 20l comprises two such damping spring arrangements 38l. A different angular extension is also possible.

The more massive embodiment of the support elements 42l without the respective spring sections also makes these support elements 42l suitable for the absorption of greater normal forces, i.e., a stronger wedge effect, upon the introduction of torques.

To avoid wearing out the displacement surface 34l during operation, the spring shell 220l is composed of hardened material, at least in its areas that form the displacement surface 34l and the support surface for the damping spring 40l. This is applicable to all of the embodiments described above, in which the cylinder-like section of the first damper element can be made of a hardened material, at least in the areas forming the displacement surface, or can have an insert or covering of hardened material.

Many modifications of the above-described embodiments of the torsional vibration damper according to the invention are possible. For example, the second damper element can be embodied in its outer circumferential surface area with a polygonal shape; in this case, the ramp-like surface areas are formed in the respective corner areas. Furthermore, deviating from the depicted embodiments, in which each corner area always forms a ramp-like surface for only one support element, it is also possible to embody the second damper element in such a way that a ramp-like surface is formed in each circumferential direction in one corner area, so that, depending on the relative rotation between the first and second damper elements, the corner area serves to take along various support elements of different damping spring arrangements located directly adjacent to each other in the circumferential direction. However, in this embodiment, in general, dead travel not existing in the depicted embodiments is created during the relative rotation between the first and second damper parts. This means that each corner of the polygonal circumferential shape must first rotate in a predetermined angular range before it can come to rest on a given support element. Further, an embodiment of the torsional vibration damper according to the invention is possible in which the first and second damper elements, in their respective areas provided for torque transmission, are located not radially opposite but axially opposite to each other. That is, each of the damper elements has a surface that is substantially orthogonal relative to the rotational axis and that faces the other damper element. One of the damper elements then has axial projections, which again form the support parts between which the damping spring arrangements are clamped and which rest in the circumferential direction on their two end areas.

The other damper element has axially projecting carrier sections on its axial surface. These carrier sections can be formed by axial ramp surfaces or the like. Upon relative rotation, the damping spring arrangements can again be taken along via corresponding support elements and compressed by these ramp elements. Here, too, an effect similar to a frictional force can be obtained by the ramp-like embodiment of the projection surfaces on the other damper element. However, in an embodiment of this sort, support means are also necessary on the radial outside to prevent the damping spring arrangement from deviating toward the radial outside.

The invention is not limited by the embodiments described above which are presented as examples only but can be modified in various ways within the scope of protection defined by the appended patent claims.

We claim:

1. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element along the associated displacement surface, and pressing the respective support element toward the displacement surface, upon relative rotation between the first and the second damper elements; and a lubricant chamber in a region of the displacement surface, which lubricant chamber is sealed at least radially and contains a lubricant therein.

2. A torsional vibration damper comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element alone the associated displacement surface, and pressing the respective support element toward the displacement surface, upon relative rotation between the first and the second damper elements; and overload protection means for damping torque peaks to be transmitted via the torsional vibration damper, the overload protection means including a frictional force production device operatively arranged to act between the first and the second damper elements so as to produce a frictional force that increases as the relative rotational angle increases between the first and second damper elements.

3. A torsional vibration damper as defined in claim 2, wherein the overload protection device comprises a slip clutch arrangement arranged to act between two components of the first damper element and a slip clutch arrangement arranged to act between two components of the second damper element.

4. A torsional vibration damper as defined in claim 2, wherein the slip clutch arrangement includes a slip ring element arranged in rotatable fashion on the first damper element so as to act in a friction-locking manner thereon, the displacement surface and the support means being arranged on the slip ring element.

5. A torsional vibration damper as defined in claim 2, wherein the frictional force production device is configured to produce substantially no frictional force up to a threshold relative rotational angle and, after the threshold relative rotational angle is exceeded, produces one of a substantially constant frictional force and a frictional force that increases as the relative rotational angle increases.

6. A torsional vibration damper comprising:
a first damper element;
a second damper element rotatable relative to the first damper element around a rotational axis;
first damping spring means for connecting the first and the second damper elements for torque transmission, the first damping spring means including at least one damping spring arrangement which extends in approximately a circumferential direction and has at least one damping spring;
support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element along the associated displacement surface, and pressing the support element toward the displacement surface, upon relative rotation between the first and the second damper elements; and bearing means for rotatably mounting the second damper element on the first damper element, the bearing means being configured so that the first and the second damper elements can carry out at least one of a tilting movement and a shifting movement in the radial direction, the carrier means on the second damper element having a convex carrier surface.

7. A torsional vibration damper as defined in claim 6, wherein the bearing means includes at least one elastically deformable bearing component.

8. A torsional vibration damper as defined in claim 7, wherein the at least one elastically deformable bearing component is a slide bearing component.

9. A torsional vibration damper as defined in claim 7, wherein the bearing means includes a bearing component arranged to act between the first and the second damper elements in substantially an axial direction, and a further bearing component arranged to act between the first and the second damper elements in substantially a radial direction.

10. A torsional vibration damper as defined in claim 6, wherein the second damper element has a convex bearing surface provided so as to rest against the bearing arrangement.

11. A torsional vibration damper comprising:
a first damper element;
a second damper element rotatable relative to the first damper element around a rotational axis;
first damping spring means for connecting the first and the second damper elements for torque transmission, the first damping spring means including at least one damping spring arrangement which extends in approximately a circumferential direction and has at least one damping spring;
support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;
respective carrier means on the second damper element for each of the support elements for carrying the support elements along on the first damper element for displacement movement of the support element along the associated displacement surface, and pressing the support element toward the displacement surface, upon relative rotation between the first and the second damper elements, the first damper element having a substantially axially extending cylinder-like section, the displacement surface being formed on an inner circumferential surface of the cylinder-like section; and
means for axially securing the support elements, the securing means being arranged to act between the first damper element and each support element.

12. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface the associated support element is movable in the circumferential direction;

carrier means on the second damper element for each of the support elements for carrying the support elements along on the first damper element for displacement movement of the support element along the associated displacement surface, and pressing the respective support element toward the displacement surface, upon relative rotation between the first and the second damper elements, the first damper element having a substantially axially extending cylinder-like section, the displacement surface being formed on an inner circumferential surface of the cylinder-like section; and means for axially securing the support elements, the securing means being arranged to act between the first damper element and each support element, the support element axial securing means including a circumferential groove on an element of the displacement surface and the support element and, on another respective element, a security projection area that engages into the circumferential groove.

13. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface the associated support element is movable in the circumferential direction;

carrier means on the second damper element for each of the support elements for carrying the support elements along on the first damper element for displacement movement of the support element along the associated displacement surface, and pressing the respective support element toward the displacement surface, upon relative rotation between the first and the second damper elements, the first damper element having a substantially axially extending cylinder-like section, the displacement surface being formed on an inner circumferential surface of the cylinder-like section;

means for axially securing the support elements, the securing means being arranged to act between the first damper element and each support element, the damping spring means including at least two damping springs, and a movable intermediate element arranged to support adjacent end areas of the damping springs, the intermediate element being movable on the displacement surface relative to the first damper element in the circumferential direction; and means for axially securing the intermediate element, the intermediate element actual securing means including a circumferential groove on an element of the displacement surface and the intermediate element and, on another respective element, a securing projection area that engages into the circumferential groove.

14. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support element along on the first damper element for displacement movement of the support element along the associated displacement surface, and pressing the respective support element toward the displacement surface, upon relative rotation between the first and the second damper elements; and a lubricant chamber in a region of the displacement surface, which lubricant chamber is sealed at least radially and contains a lubricant therein, the carrier means on the second damper element having a convex carrier surface.

15. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element along the associated displacement surface, and pressing the respective support element toward the displacement surface, upon relative rotation between the first and the second damper elements;

a lubricant chamber in a region of the displacement surface, which lubricant chamber is sealed at least radially and contains a lubricant therein; and overload protection means for damping torque peaks to be transmitted via the torsional vibration damper, the overload protection means including a frictional force production device operatively arranged to act between the first and the second damper elements so as to produce a frictional force that increases as the relative rotational angle increases between the first and second damper elements, the frictional force production device being configured to produce substantially no frictional force up to a threshold relative rotational angle and, after the threshold relative rotational angle is exceeded, produces one of a substantially constant frictional force and a frictional force that increases as the relative rotational angle increases.

16. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element along the associated displacement surface, and pressing the respective support element toward the displacement surface, upon relative rotation between the first and the second damper elements; and a lubricant chamber in a region of the displacement surface, which lubricant chamber is sealed at least radially and contains a lubricant therein, the damping spring arrangement including at least two damping springs, and an intermediate element arranged to support adjacent ends of the two damping springs, the intermediate element being movable relative to the first damper element in the circumferential direction, a plurality of the damping spring arrangements being arranged at substantially a uniform distance from one another in the circumferential direction, the intermediate elements being arranged on a carrier ring rotatable relative to the first damper element.

17. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element along the associated displacement surface, and pressing the respective support element toward the displacement surface, upon relative rotation between the first and the second damper elements;

a lubricant chamber in a region of the displacement surface, which lubricant chamber is sealed at least radially and contains a lubricant therein, the first damper element having a substantially axially extending cylinder-like section, the displacement surface being formed on an inner circumferential surface of the cylinder-like section; and means for axially securing the support elements, the securing means being arranged to act between the first damper element and each support element.

18. A torsional vibration damper, comprising:

a first damper element;

a second damper element rotatable relative to the first damper element around a rotational axis;

first damping spring means for connecting the first and the second damper elements for torque transmission, the first damping spring means including at least one damping spring arrangement which extends in approximately a circumferential direction and has at least one damping spring;

support means for supporting the damping spring arrangement, the support means being provided on the first damper element, the support means including support elements which support end areas of the spring arrangement in a substantially circumferential direction, the first damper element having a displacement surface for each support element, along which displacement surface a correspondingly configured displacement surface of the associated support element is movable in the circumferential direction;

respective carrier means on the second damper element for each of the support elements for carrying the support elements along on the first damper element for displacement movement of the support element along the associated displacement surface, and pressing the respective support element toward the displacement surface, upon relative rotation between the first and the second damper elements; and a lubricant chamber in a region of the displacement surface, which lubricant chamber is sealed at least radially and contains a lubricant therein; and overload protection means for damping torque peaks to be transmitted via the torsional vibration damper, the overload protection means comprising a slip clutch arrangement arranged to act between two components of the first damper element and a slip clutch arrangement arranged to act between two components of the second damper element.

* * * * *